US008948976B1

(12) United States Patent
Unruh

(10) Patent No.: US 8,948,976 B1
(45) Date of Patent: Feb. 3, 2015

(54) SEED RESEARCH PLOT PLANTER AND FIELD LAYOUT SYSTEM

(75) Inventor: Stacy L. Unruh, Haben, KS (US)

(73) Assignee: Seed Research Equipment Solutions, LLC, South Hutchinson, KS (US)

( * ) Notice: Subject to any disclaimer, the term of this patent is extended or adjusted under 35 U.S.C. 154(b) by 522 days.

(21) Appl. No.: 13/286,549

(22) Filed: Nov. 1, 2011

Related U.S. Application Data

(60) Provisional application No. 61/408,907, filed on Nov. 1, 2010.

(51) Int. Cl.
*A01C 7/08* (2006.01)

(52) U.S. Cl.
USPC .............................. 701/50; 111/171; 111/200

(58) Field of Classification Search
USPC ..................... 701/50; 700/225, 231; 111/200, 111/177–185, 170, 171
See application file for complete search history.

(56) References Cited

U.S. PATENT DOCUMENTS

| | | | |
|---|---|---|---|
| 3,362,601 A * | 1/1968 | Ford et al. ............. | 226/122 |
| 4,616,577 A * | 10/1986 | van der Lely .......... | 111/178 |
| 5,050,771 A | 9/1991 | Hanson et al. | |
| 5,170,730 A | 12/1992 | Swallow | |
| 5,684,476 A | 11/1997 | Anderson | |
| 5,924,371 A | 7/1999 | Flamme et al. | |
| 6,122,581 A | 9/2000 | McQuinn | |
| 6,199,000 B1 | 3/2001 | Keller et al. | |
| 6,474,500 B1 | 11/2002 | Carr et al. | |
| 6,505,124 B2 | 1/2003 | Carr et al. | |
| 6,615,754 B2 | 9/2003 | Unruh et al. | |
| 6,626,120 B2 | 9/2003 | Bogner et al. | |
| 6,832,567 B2 | 12/2004 | Carr et al. | |
| 6,834,600 B1 | 12/2004 | Clewell et al. | |
| 7,111,567 B2 | 9/2006 | Carr et al. | |
| 7,337,733 B2 | 3/2008 | Carr et al. | |
| 7,673,572 B2 | 3/2010 | Deppermann et al. | |

(Continued)

FOREIGN PATENT DOCUMENTS

WO 98/42178 10/1998

OTHER PUBLICATIONS

Seed Research Equipment Solutions, Precision Vacuum Planters, catalog, Sep. 2007, 12 pages, SRES, South Hutchinson, Kansas.

(Continued)

*Primary Examiner* — Christopher J Novosad
(74) *Attorney, Agent, or Firm* — Thompson & Thompson, P.A.; Jeffrey L. Thompson

(57) ABSTRACT

A seed research plot planter includes a rotating seed plate for picking up and transporting seeds from a seed chamber to a release point, and a sensor that detects the rotational position of the seed plate. A distance measuring device measures a distance traveled by the planter. A controller uses a first signal from the sensor and a second signal from the distance measuring device to control a sequence of operations of the planter based on the rotational position of the seed plate and the location of the planter within the field. A field layout system is provided for creating a plot field layout having a desired number of ranges, a desired number of planter passes, and desired parameters for each plot within the field. The field layout system allows different plot lengths and seed populations to be input for individual plots within the same planter pass through the field.

20 Claims, 33 Drawing Sheets

(56) References Cited

U.S. PATENT DOCUMENTS

| | | |
|---|---|---|
| 7,775,167 B2 | 8/2010 | Stehling et al. |
| 7,938,075 B1 | 5/2011 | Glendenning et al. |
| 2010/0070072 A1* | 3/2010 | Goldman et al. ............. 700/225 |
| 2012/0067262 A1* | 3/2012 | Wilhelmi et al. ............. 111/183 |

OTHER PUBLICATIONS

Seed Research Equipment Solutions, Precision Vacuum Planters, Accuracy Efficiency Integrity, catalog, 2010, 20 pages, SRES, South Hutchinson, Kansas.

* cited by examiner

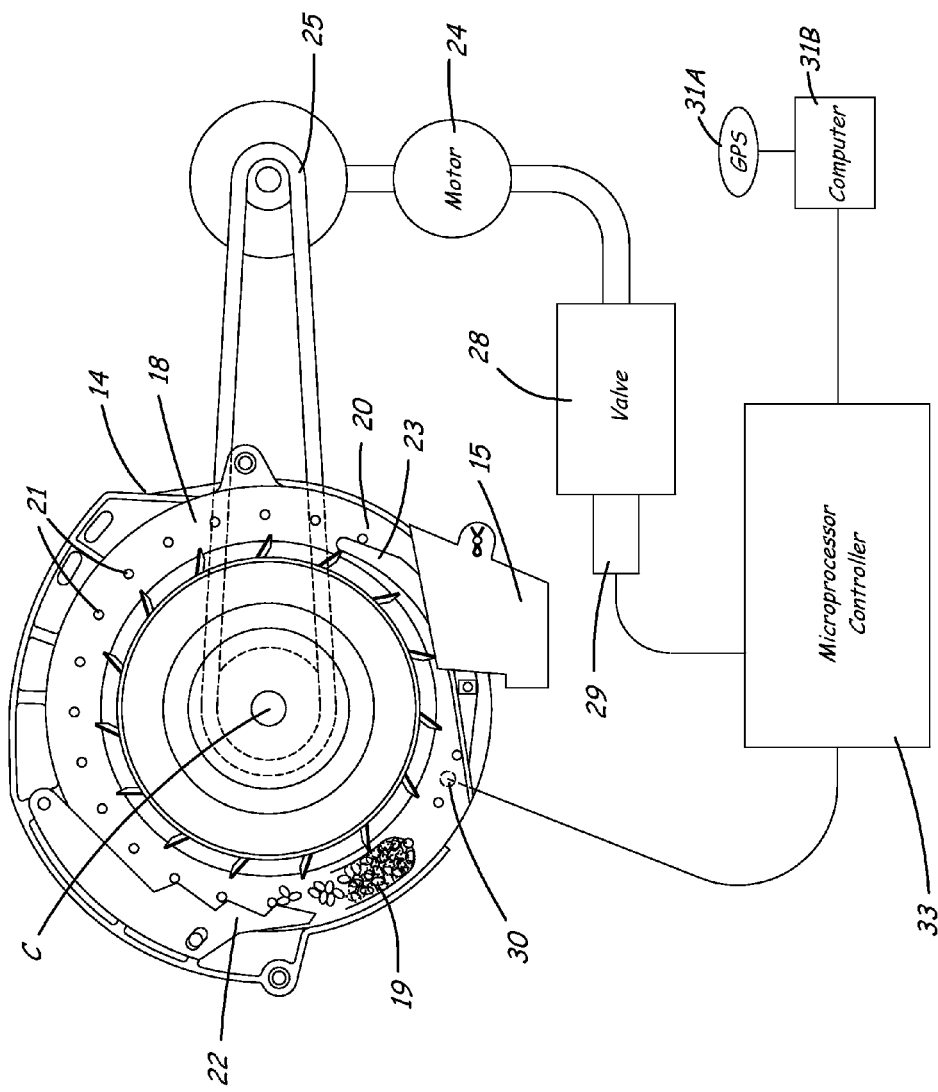

SEED RESEARCH PLOT PLANTER AND FIELD LAYOUT SYSTEM

RELATED APPLICATIONS

This application claims the benefit of U.S. Provisional Patent Application No. 61/408,907 filed on Nov. 1, 2010. The entire contents of this provisional application are incorporated herein by reference.

BACKGROUND OF THE INVENTION

1. Field of the Invention

The present invention relates generally to seed planters, and in particular to seed planters used for planting research plots. The present invention also relates to methods and systems for laying out research plots.

2. Description of the Related Art

Seed research plot fields are commonly used by researchers to obtain yield and growth data for different seed types. Such fields typically contain several individual seed plots arranged in the same field, with each plot containing one or more rows and with alleyways separating the end of the rows of one plot from the beginning of the rows of the next plot. The plot fields are typically planted using a planter that plants multiple plots with alleyways between each plot during each pass of the planter through the field.

Special planters have been developed for planting research plot fields. For example, U.S. Pat. No. 6,615,754 issued to Unruh et al. and U.S. Pat. No. 6,626,120 issued to Bogner et al. provide examples of such planters.

Conventional controllers for plot planters have required researchers to go through a complicated setting process to make the planter plant the desired plot length and alley length.

There is a need in the industry for an improved research plot planter that requires fewer input settings for the operator in the field, and a field layout system that allows research plot fields to be easily laid out with a variety of different parameters for the individual plots within the field.

SUMMARY OF THE INVENTION

An object of the present invention is to provide a seed research plot planter having a controller and a plot management system that allows a researcher to assign various plot lengths, seed populations, rows per plot, and other plot parameters within a research field.

A further object of the present invention is to provide a seed research plot planter and plot management system that allows plot layout, plot population, rows per plot, and other plot parameters to be randomized and laid out by a researcher in advance of planting.

A further object of the present invention is to provide a research plot field layout system that creates a graphical representation of the plot layout, including a thematic color coded map illustrating differences in assigned plot parameters within a research field.

A further object of the present invention is to provide a research plot planter that requires fewer input settings to prepare the planter for planting.

A further object of the present invention is to provide a research plot planter that creates alleyways between plots that are lined up.

A further object of the present invention is to provide a research plot planter that senses the rotational position of the seed plate within the seed metering assembly, and correlates the rotational position of the seed plate with the position of the planter on the ground to time the sequence of operations of the seed metering assembly and create alleyways between plots that are lined up regardless of the speed driven.

To accomplish these and other objects of the present invention, a seed research plot planter is provided that includes a rotating seed plate for picking up and transporting seeds from a seed chamber to a release point, and a sensor that detects the rotational position of the seed plate. A distance measuring device measures a distance traveled by the planter. A controller uses a first signal from the sensor and a second signal from the distance measuring device to control a sequence of operations of the planter based on the rotational position of the seed plate and the location of the planter within the field.

The invention also includes a field layout system for creating a plot field layout having a desired number of ranges, a desired number of planter passes, and desired parameters for each plot within the field. The field layout system allows different plot lengths and seed populations to be input for individual plots within the same planter pass through the field.

According to one aspect of the present invention, a seed planter is provided, comprising: a seed chamber for receiving seeds to be planted; a rotating seed plate that cooperates with the seed chamber to pick up and transport individual seeds from the seed chamber to a release point, where the seeds fall to the earth; and a sensor that detects the rotational position of the seed plate.

The seed plate comprises a plurality of symmetrically spaced apart holes arranged concentric with a center of the seed plate, and the sensor is an optical sensor that transmits and receives light through the holes as the seed plate rotates relative to the sensor. The optical sensor is located between the release point and the seed chamber for transmitting and receiving light through the holes of the seed plate at a point in which the holes are not covered by seeds. A signal from a distance measuring device associated with the planter can be used to control the rotation of the seed plate.

According to another aspect of the present invention, a seed research plot management system is provided, comprising: a computer program loaded on a computer for creating a field layout for a seed research field, the field layout being useable to control operation of a seed planter while planting a plurality of seed plots in the research field. The computer program comprises: a means for inputting a desired number of ranges and a desired number of planter passes for the research field; a means for inputting one or more desired parameters for each individual plot within the research field; and a means for processing the inputs to create the field layout having the desired number of ranges, the desired number of planter passes, and the desired parameters for each individual plot within the field.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIG. 2B is an illustration similar to FIG. 2A, showing another embodiment in which a GPS device and a computer algorithm are used to generate location signals at a pulse frequency that varies with the speed of the planter.

FIG. 23 is a screen print displayed by the computer program for starting a plot layout process.

FIG. 25 is a screen print displayed by the computer program showing a process of adding and editing new plot groups.

DETAILED DESCRIPTION OF THE INVENTION

A research plot planter and research plot field layout system according to the present invention will now be described with reference to FIGS. 1 to 40 of the accompanying drawings.

Figure 1:
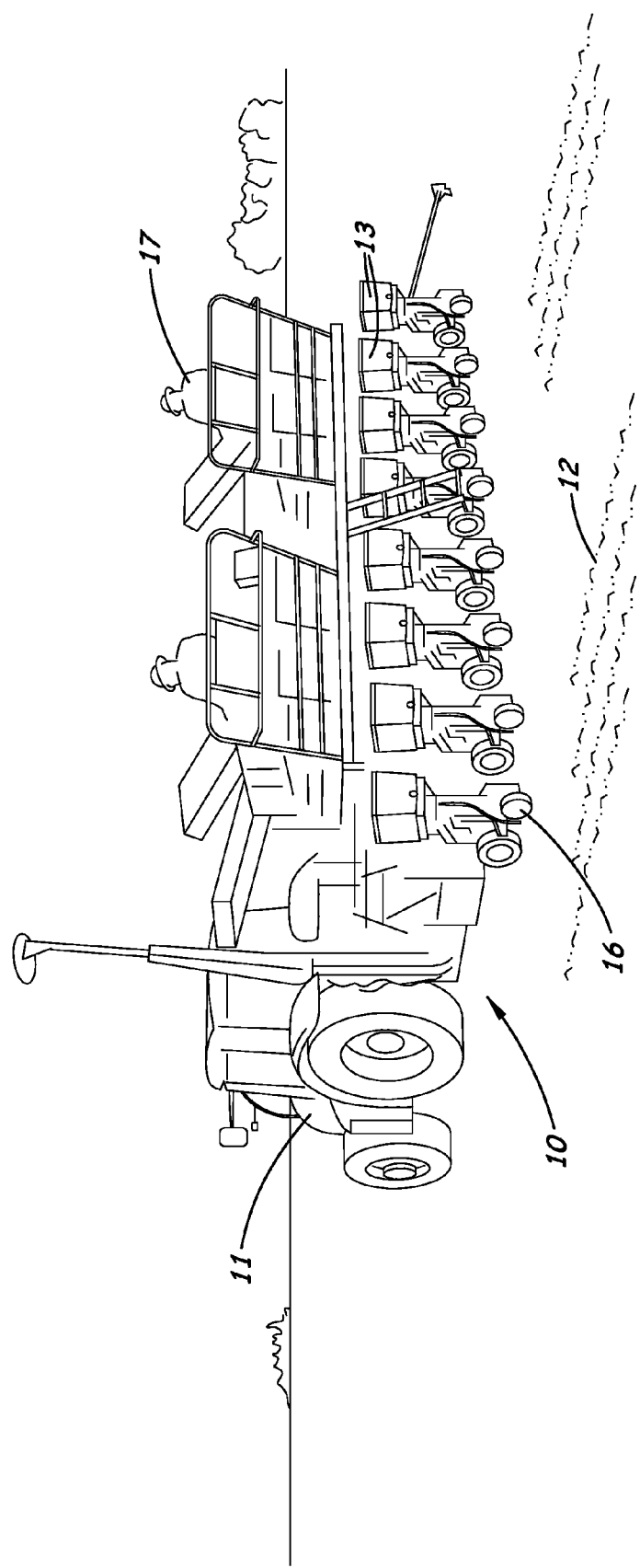
FIG. 1 is a perspective view of a research plot planter being pulled by a tractor through a research plot field.

FIG. 1 shows a research plot planter 10 being pulled by a tractor 11 through a research plot field 12. The research plot field 12 is used by researchers to obtain yield and growth data for different seed types, and therefore contains several individual seed plots, with each plot containing one or more rows and with alleyways separating the end of the rows of one plot from the beginning of the rows of the next plot. For example, the research plot field 12 may have as many as several hundred or even thousands of individual plots separated by alleyways that mark the end of one plot and the beginning of another plot.

The planter 10 shown in FIG. 1 has eight row units 13 that plant eight rows at a time as the planter 10 makes a pass through the field. Each row unit 13 has, among other things, a furrow opener, a seed meter assembly 14 (described below with reference to FIGS. 2A to 21), a seed tube 15 for guiding seeds from the seed meter assembly 14 into the furrow created by the opener, and a furrow closing assembly 16.

Also shown in FIG. 1 are two researchers 17 seated on the planter 10 to monitor the planter operations and to ensure that the proper seed varieties are loaded into the planter row units 13 for each of the plots.

Figure 2A:
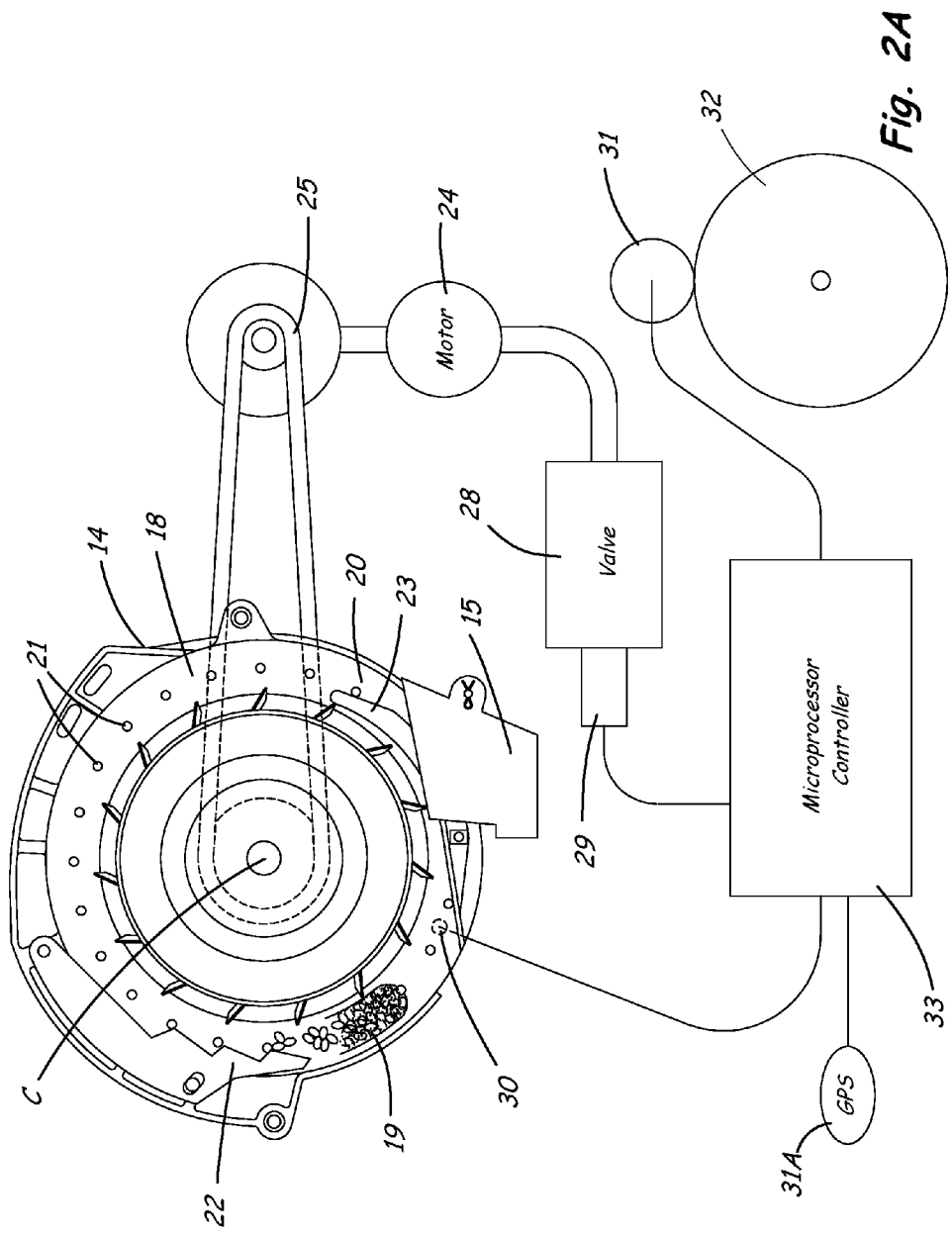
FIG. 2A is an illustration of some of the components of the research plot planter, including a seed meter assembly, a hydraulic drive motor for driving the seed meter assembly through a sprocket and chain assembly, a distance measuring device, a seed plate position sensor, and a control valve for controlling the hydraulic drive motor.

FIG. 2A is a schematic illustration showing some of the components of the research plot planter 10 associated with one planter row unit 13. The seed meter assembly 14 of the row unit 13 is shown in a cutaway side view with a rotating seed plate 18 that picks up and transports individual seeds from a seed chamber 19 within the seed meter assembly 14 to a release point 20. The seed plate 18 has a plurality of symmetrically spaced apart seed pockets 21 arranged concentric with a center C of the seed plate 18. Each seed pocket 21 has a small hole extending through the seed plate 18 for allowing a vacuum source on the back side of the seed plate 18 to pull seeds into the seed pockets 21 and hold the seeds in the seed pockets 21 until the seeds are released at the release point 20.

As seeds in the seed chamber 19 are picked up on the seed plate 18 there may be multiple seeds on a single seed pocket 21. A singulator element 22 located just above the seed chamber 19 provides a three step progression for gradually rubbing off excess seeds from the seed plate 18 to ensure that only one seed per seed pocket 21 is carried by the seed plate 18.

The seed plate 18 is easily interchangeable with other seed plates so that the size and number of the seed pockets 21 can be matched to the particular seed type being planted. For example, seed plates 18 for planting corn will typically be different than seed plates for planting other crops, such as soybeans.

At the release point 20, the vacuum is cut off and the seeds are released from the seed plate 18 and fall into the seed tube 15, which guides the seeds into a furrow in the earth created by the furrow opener. An ejector element 23 positioned at the release point 20 makes sure the seeds come off of the seed plate 18 at the right time. The ejector element 23 also directs the seed down the center of the seed tube 15, thereby reducing seed bounce for increased seed spacing accuracy.

A hydraulic drive motor 24 is used for driving the rotation of the seed plate 18 of the seed meter assembly 14 through a sprocket and chain assembly 25. The same drive motor 24 can be used to drive multiple seed meter assemblies 14 by extending the drive force across the planter 10 with a rotating shaft and additional sprocket and chain assemblies (not shown). The seed plate 18 of the seed meter assembly 14 is mounted on a driven shaft connected to the sprocket and chain assembly 25.

The hydraulic drive motor 24 is controlled by a hydraulic valve 28 that controls the hydraulic flow to the motor 24. The valve 28 allows the rotating speed of the drive motor 24 to be precisely controlled and changed to control the rotational speed and position of the seed plate 18. An electric control element 29, such as a solenoid or other suitable device, is connected to the valve 28 for changing the valve setting to change the hydraulic flow to the motor 24.

A sensor 30 is provided on the seed meter assembly 14 for detecting the rotational position of the seed plate 18. The sensor 30 can be an optical sensor that transmits and receives light through the holes 21 in the seed plate 18 as the seed plate rotates relative to the sensor 30. The sensor 30 is located between the release point 20 and the seed chamber 19 so that the sensor 30 can transmit and receive light through the holes 21 of the seed plate 18 at a point in which the holes are not covered by seeds. In one embodiment, the sensor 30 is a fiber optic sensor having a transmitter positioned on one side of the seed plate 18 and a receiver positioned on the other side of the seed plate.

A distance measuring device 31 is provided on the planter 10 for measuring a distance traveled by the planter 10. The distance measuring device 31 can be, for example, an encoder associated with a ground engaging wheel 32 of the seed planter 10. The distance measuring device 31 provides output pulses as the wheel 32 rotates, which can be counted by a suitable counter associated with the controller 33 to keep track of the distance traveled and position of the planter 10. A GPS device 31A or other location sensing device can be used with, or instead of, the distance measuring device 31, to determine the location of the planter 10 in the field. In one embodiment, the GPS device 31A is used to reset the distance measuring device 31 at predetermined locations in the field to reduce any accumulated error in the measured distance as the planter 10 travels across the field.

Figure 2C:
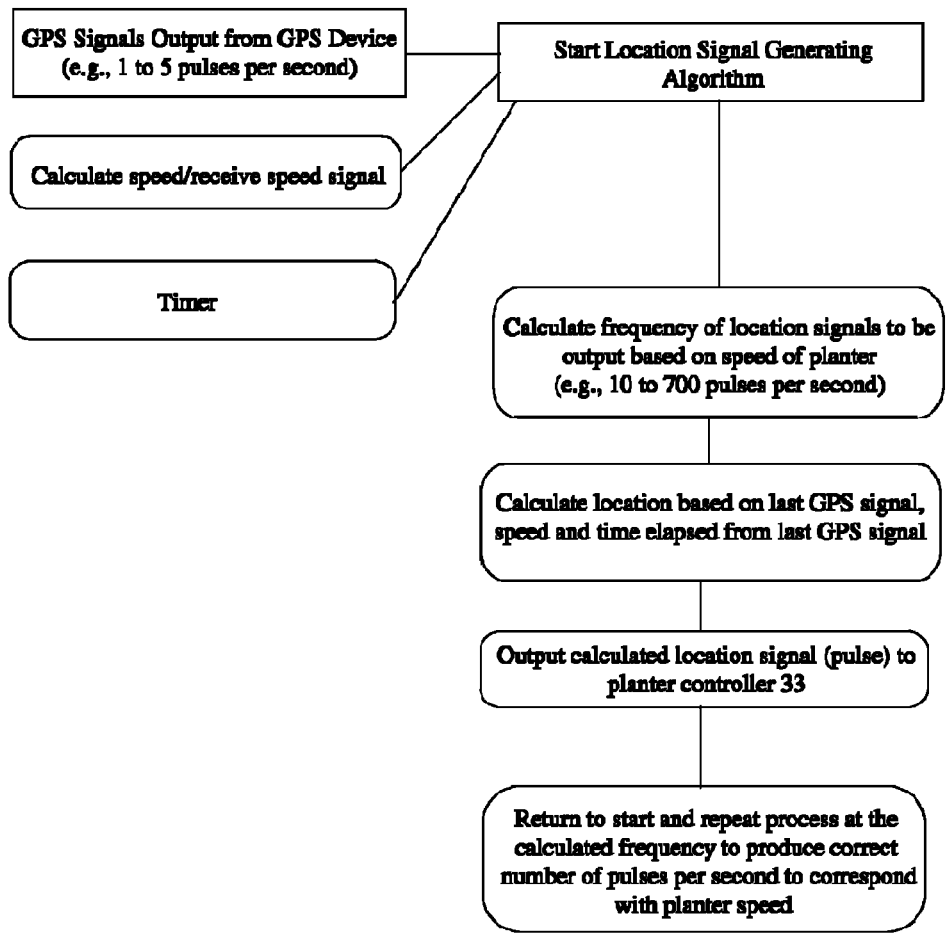
FIG. 2C is a flowchart of the computer algorithm used in the embodiment illustrated in FIG. 2B.

In another embodiment, as shown in FIGS. 2B and 2C, a GPS device 31A is used together with a computer algorithm 31B to determine a precise location of the planter 10 in the field based on the GPS signals, the speed of the planter 10, and a timer function. A flow chart showing the steps of the computer algorithm 31B is provided in FIG. 2C.

The computer algorithm 31B can be used to generate location signals at an output pulse frequency that varies based on the speed of the planter 10. For example, the location signals can be generated and output by the computer algorithm 31B at approximately 88 Hz per mph to simulate output signal pulses from a distance measuring encoder. Thus, if the planter 10 is traveling at 4 mph, the location signals may be generated and output by the computer algorithm 31B at approximately 352 pulses per second. The computer algorithm 31B can also compute the exact position based on the last GPS position signal received from the GPS device 31A, the detected speed of the planter 10, and the time elapsed from the last GPS position signal. The location signals can be generated and output more frequently by the algorithm 31B than the GPS position signals output from the GPS device 31A to allow a more precise coordination of the planter tripping functions relative to the position of the planter 10, and particularly more precise stopping and starting of the planter 10 at the alleyways and the ends of the field. Since the planter 10 may travel several inches between the GPS position signals output from the GPS device 31A at normal planting speeds, the higher frequency location signals generated and output by the computer algorithm 31B provide more crisp and precise starting and stopping points at the edges of the alleyways and the field. The location signals can be provided from the computer algorithm 31B to the controller 33 (described below) in the same manner as location signals from the encoder 31 are used in the other embodiment described above.

A microprocessor controller 33 and computer program are used to control the planter functions based on the rotational position of the seed plate 18 and the location of the planter 10 within the field. The controller 33 receives a first signal from the seed plate sensor 30 and a second signal from the distance measuring device 31. The first and second signals are used by the controller 33 to control the rotation speed of the seed plate 18 and to tie the seed plate position to the specific functions of the planter 10. An output from the controller 33 is used to control the electric element 29 associated with the hydraulic valve 28 to control the hydraulic flow to the hydraulic motor 24.

The research plot planter 10 has several planter functions that occur in sequence as the planter makes a pass through the field. Many of these planter functions involve the seed meter assembly 14 and its process of changing the seed variety from one plot to the next. To provide a better understanding of the present invention, a sequence of seed meter operations for the plot planter will be described with reference to FIGS. 3 to 21.

Figure 3:
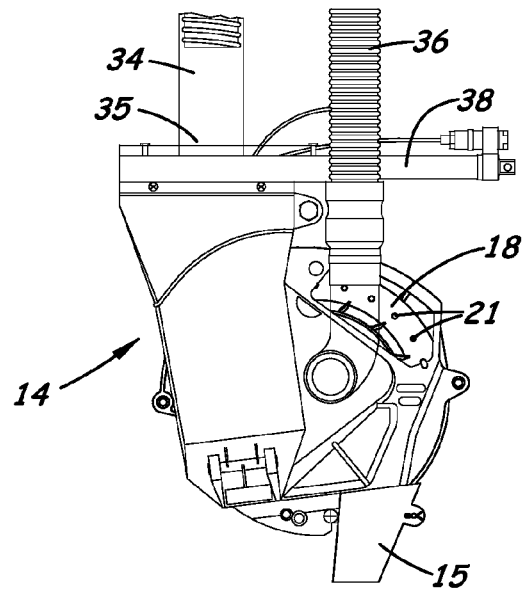
FIG. 3 is an illustration of the seed meter assembly of the research plot planter.

In FIG. 3, a seed meter assembly of the plot planter is illustrated. A seed inlet tube 34 and staging area 35 are provided at the entrance of the seed meter assembly 14, and the seed tube 15 is provided at the bottom exit of the assembly 14. A seed evacuation line 36 connected to the seed meter assembly 14 is also shown in FIG. 3.

Figure 4:
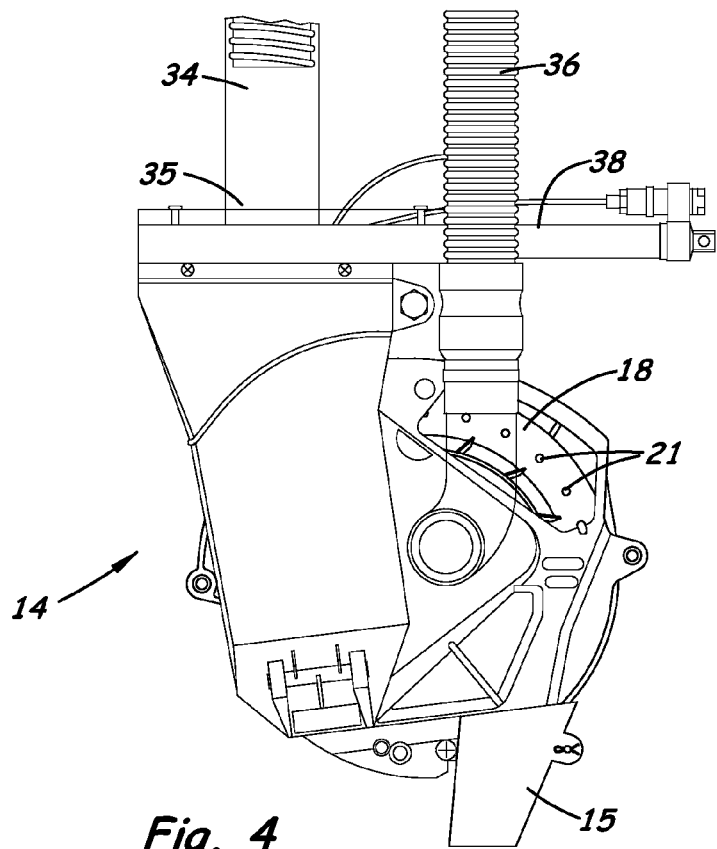
FIG. 4 is a detail view of a top portion of the seed meter assembly showing a staging area for seeds entering the seed meter assembly.
Figure 5:
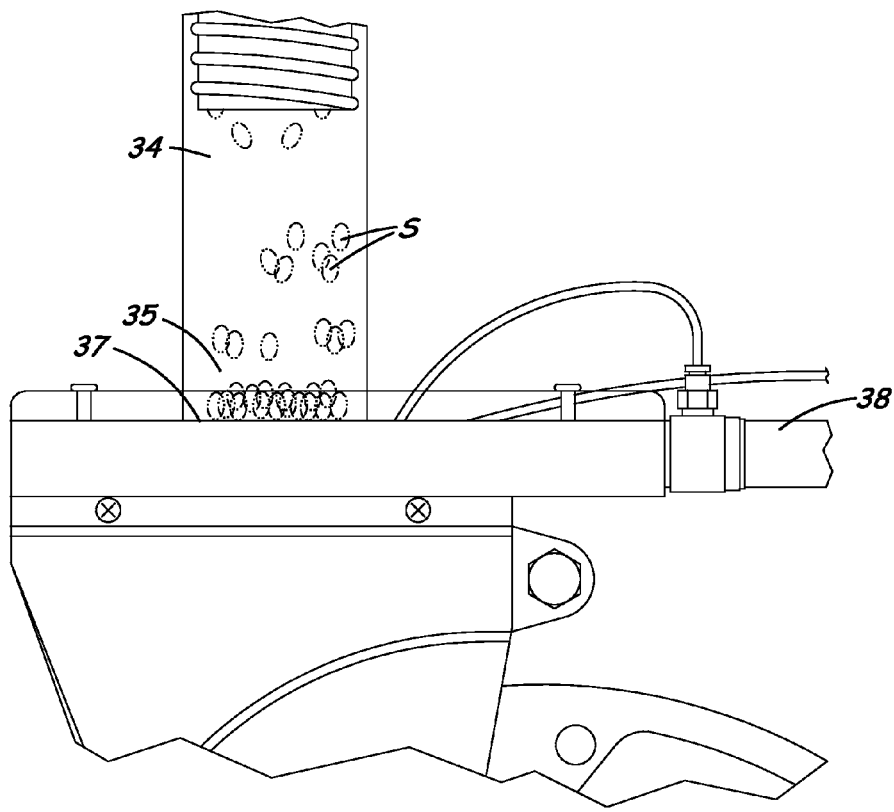
FIG. 5 is a detail view of the staging area shown in FIG. 4, with seeds falling through an inlet tube onto a staging gate.
Figure 6:
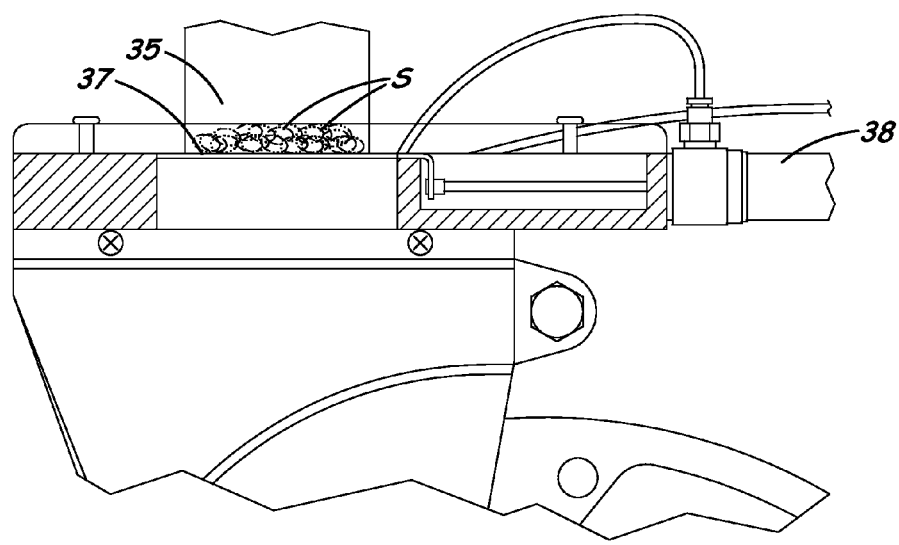
FIG. 6 is another detail view of the staging area showing a complete packet of seeds loaded on top of the staging gate.

FIG. 4 shows the top portion of the seed meter assembly 14 with the staging area 35 for seeds to be loaded before they enter the seed meter assembly 14. FIG. 5 shows the seeds S dropping through the inlet tube 34 onto a staging gate 37 of the staging area 35, and FIG. 6 shows the staging area 35 with a complete packet of seeds loaded on top of the staging gate 37. For example, the researchers riding on the planter can dump a packet of seeds into a hopper at their work station that allows the seeds to drop through the inlet tube 34 and onto the staging gate 37. The staging area 35 evens out all of the hose bounce and other differences between the row units and ensures that all rows will have a consistent starting point.

Figure 7:
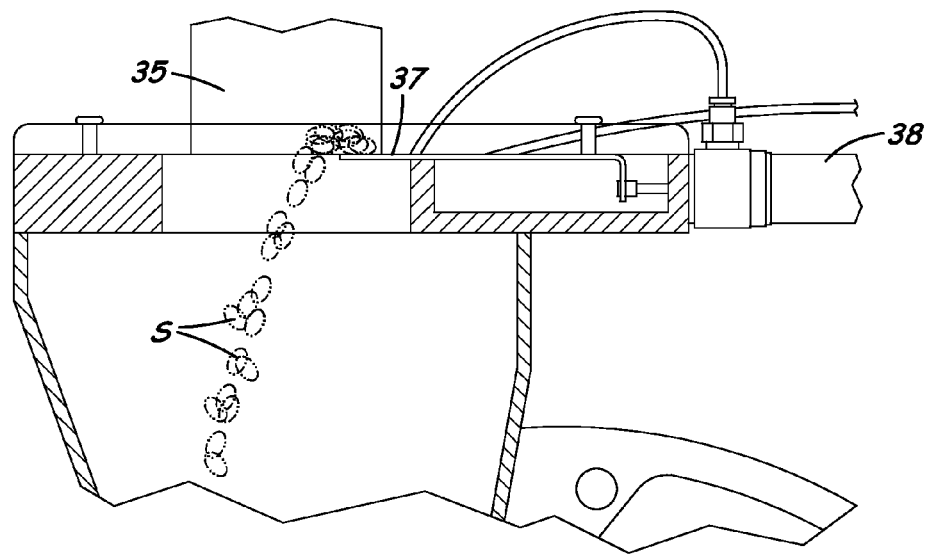
FIG. 7 is a detail view showing the staging gate in the process of opening to allow the seeds to fall into the seed chamber of the seed meter assembly.
Figure 8:
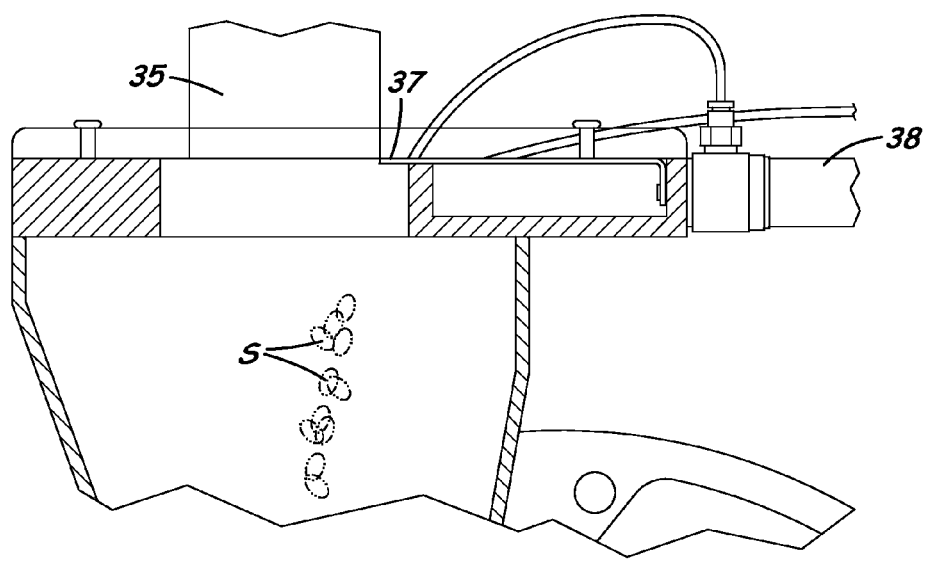
FIG. 8 is a detail view showing the staging gate completely open and all of the seeds having fallen into the seed chamber.
Figure 9:
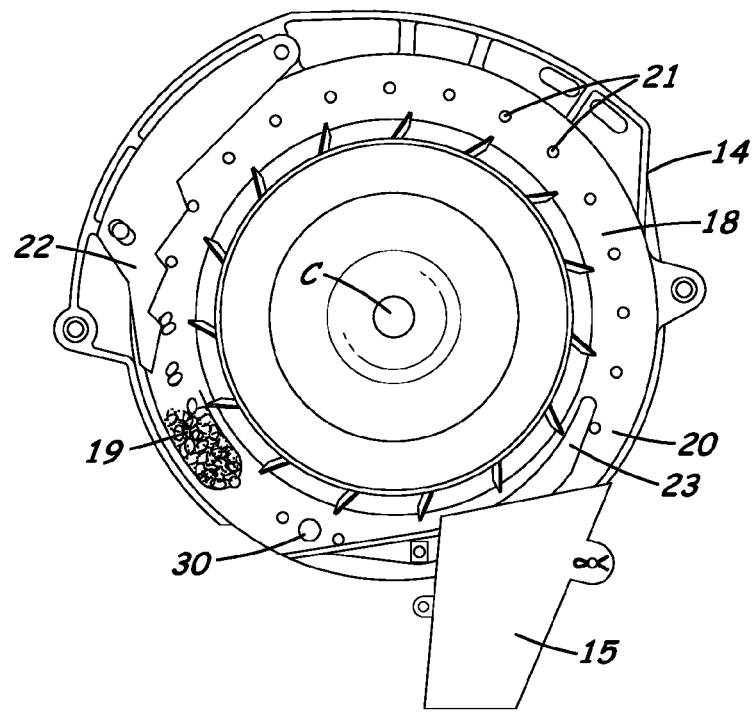
FIG. 9 is an illustration of the seed meter assembly showing the seeds in the seed chamber ready to be loaded onto the seed plate and singulated by the singulator.

FIG. 7 shows the staging gate 37 in the process of opening to allow the seeds S to fall into the seed chamber 19 of the seed meter assembly 14. A linear solenoid 38 can be used to move the staging gate 37. FIG. 8 shows the staging gate 37 completely open and all of the seeds S having fallen into the seed chamber 19. FIG. 9 shows the seeds S in the seed chamber 19 ready to be loaded onto the seed plate 18. At this point, the seeds S are prevented from being picked up and carried by the rotating seed plate 18 until the planter reaches its desired starting point and has completed any other necessary operations. An alley wiper element 39 (see FIG. 18) on the back side of the seed plate 18 is used to block vacuum to the holes 21 in the seed plate 18 to cause the seeds S to fall away from the holes 21 and remain in the seed chamber 19.

Figure 10:
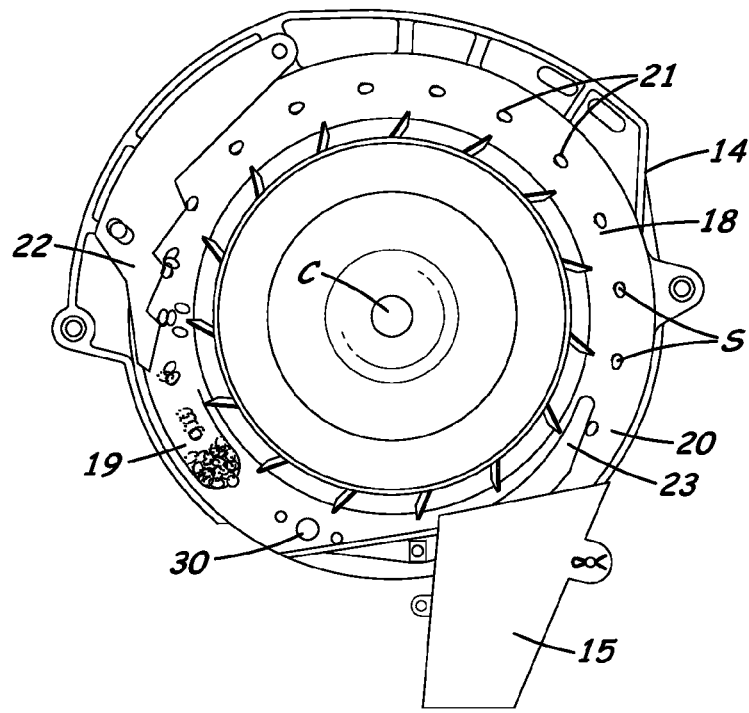
FIG. 10 is an illustration showing the seed plate loaded with singulated seeds that are released from the seed plate at a release point for dropping into a seed tube that guides the seeds into a furrow created by the planter.

Once the alley wiper 39 is removed from the seed plate 18, the seeds S are picked up from the seed chamber 19 by the seed pockets 21 of the seed plate 18, singulated by the singulator element 22, and carried to the seed release point 20. FIG. 10 shows the seed plate 18 loaded with singulated seeds that are being released from the seed plate 18 at the release point 20 and dropping into the seed tube 15 that guides the seeds into a furrow created by the planter.

Figure 11:
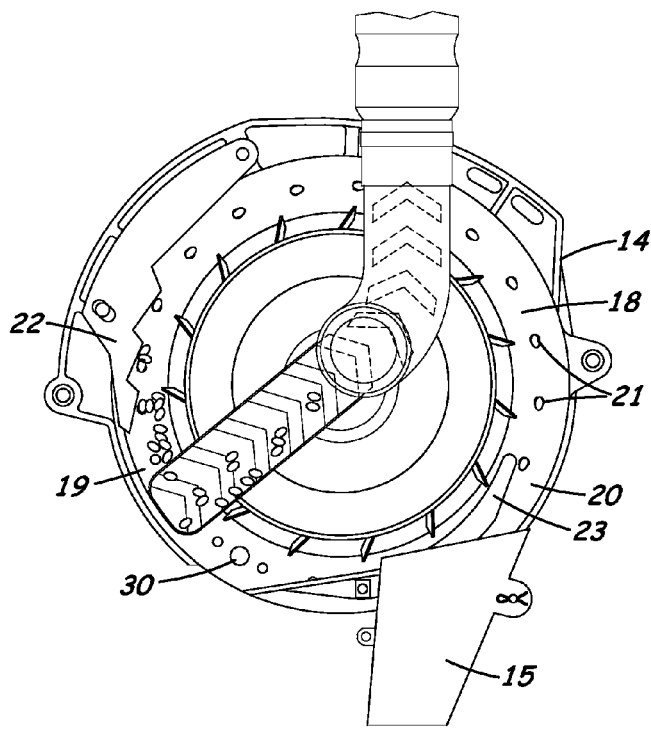
FIGS. 11 and 12 are illustrations showing an evacuation function for evacuating seeds from the seed chamber once the desired number of seeds have been loaded onto the seed plate.
Figure 12:
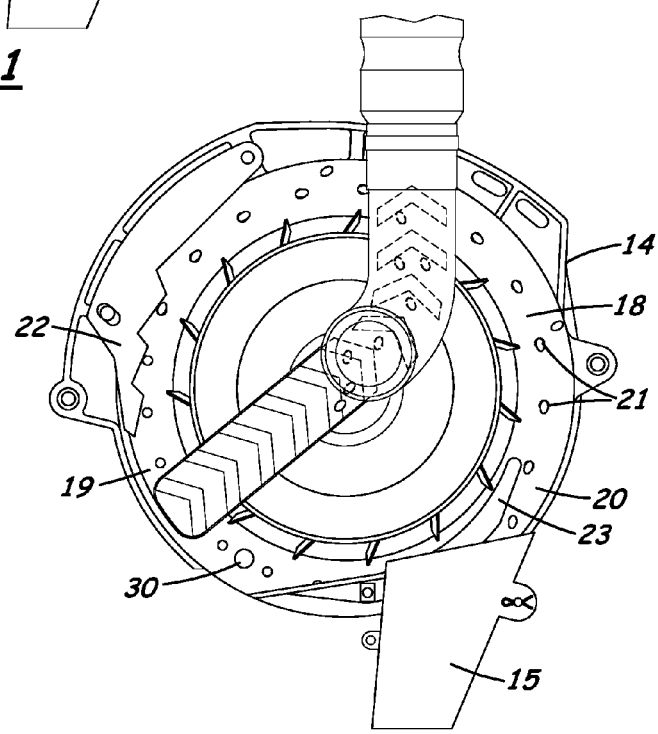
Figure 13:
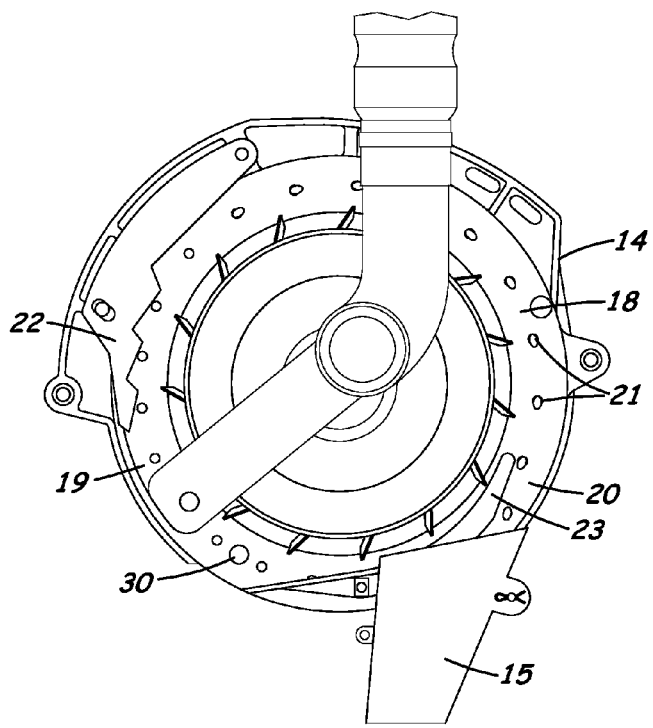
FIG. 13 is an illustration showing the seed plate continuing to rotate and release seeds after the excess seeds have been evacuated from the seed chamber.

When the desired number of seeds for the current seed plot have been loaded onto the seed plate 18 and the last seed needed for the plot clears the alley wiper 39, the alley wiper 39 is activated again to prevent any additional seeds from being loaded onto the seed plate 18. The alley wiper 39 ensures that all rows stop planting at the same time. An evacuation function using the evacuation line 36 is also activated at this time for evacuating excess seeds from the seed chamber 19. As shown in FIGS. 11 and 12, the evacuation function evacuates all of the excess seeds from the seed chamber 19 while leaving the seeds already loaded on the seed plate 18. As shown in FIG. 13, the seed plate 18 continues to rotate and release seeds after the excess seeds have been evacuated from the seed chamber 19.

Figure 14:
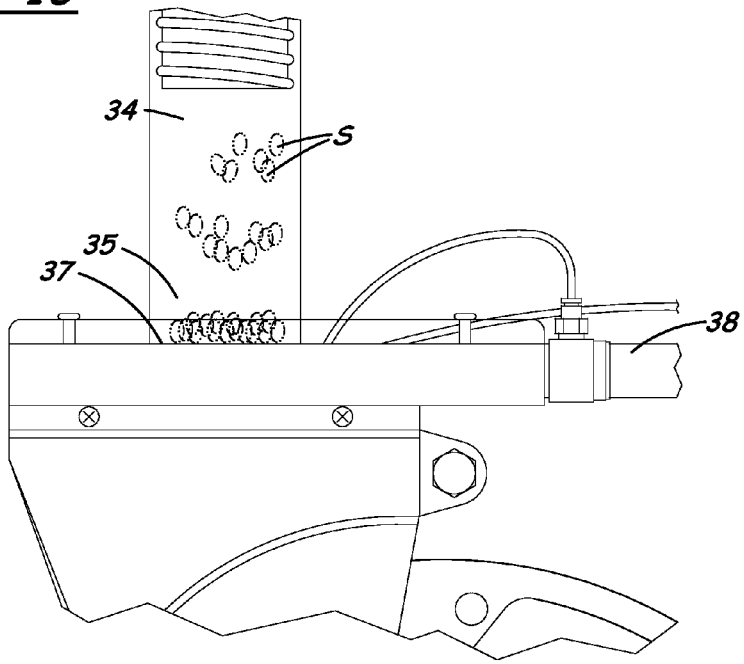
FIG. 14 is another detail showing a new variety of seeds being loaded into the staging area.
Figure 15:
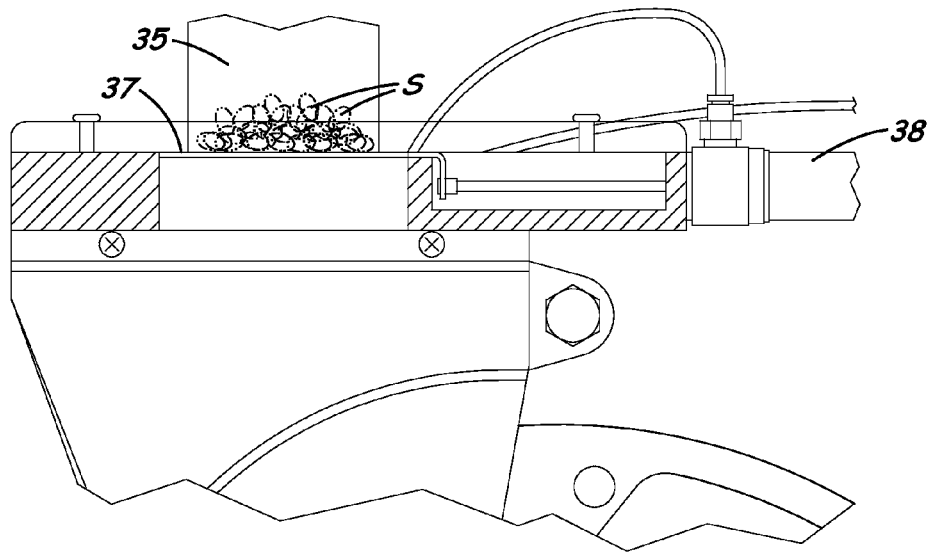
FIG. 15 is another detail view showing a complete packet of the new seeds loaded on top of the staging gate.

During or before the evacuation function, the planter is also restaging its next seed variety in the staging area 35, as shown in FIG. 14. A complete packet of the new variety of seeds are loaded on top of the staging gate 37, as shown in FIG. 15.

Figure 16:
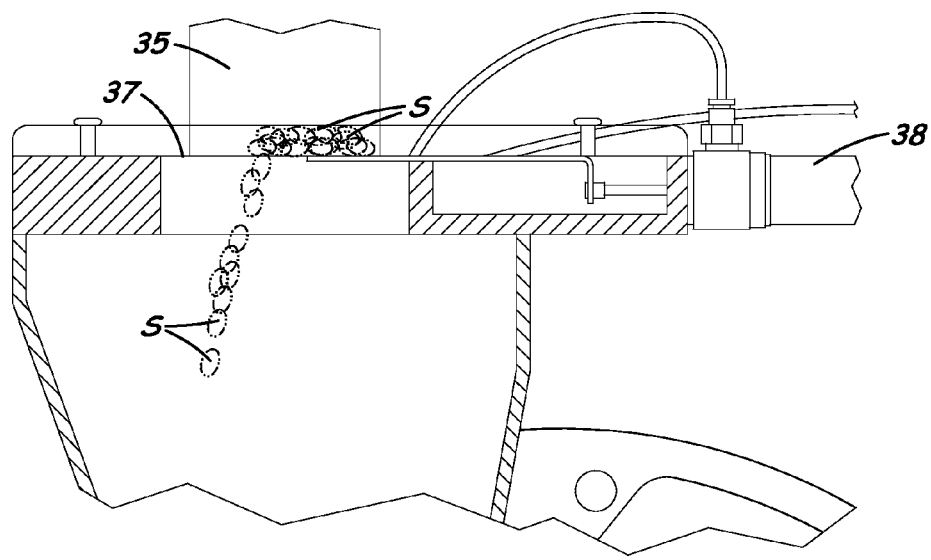
FIG. 16 is a detail view showing the staging gate in the process of opening to allow the new seeds to fall into the seed chamber.
Figure 17:
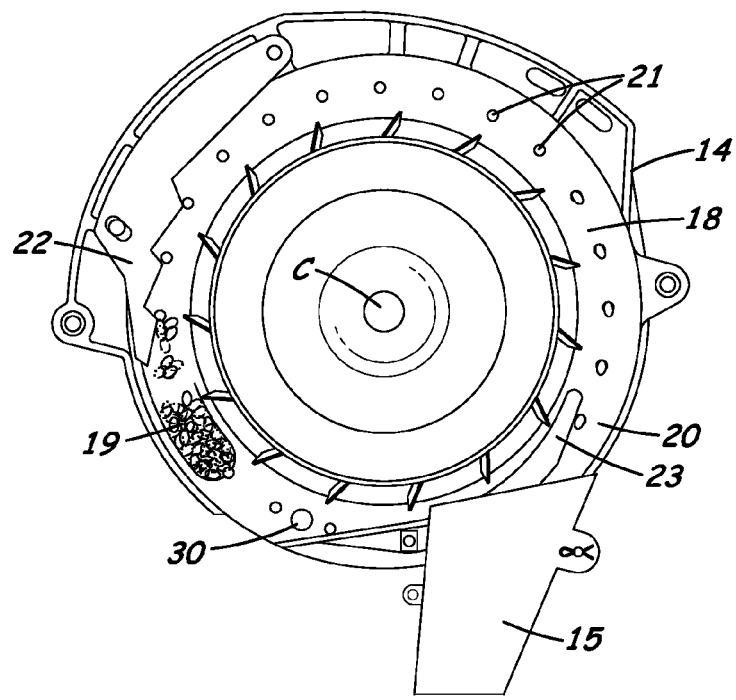
FIG. 17 is an illustration showing the new seeds in the seed chamber.

Once the evacuation function is completed, the staging gate 37 opens again to load the new seed variety in the seed chamber 19. FIG. 16 shows the staging gate 37 in the process of opening to allow the new seeds to fall into the seed chamber 19, and FIG. 17 shows the new seeds in the seed chamber 19.

Figure 18:
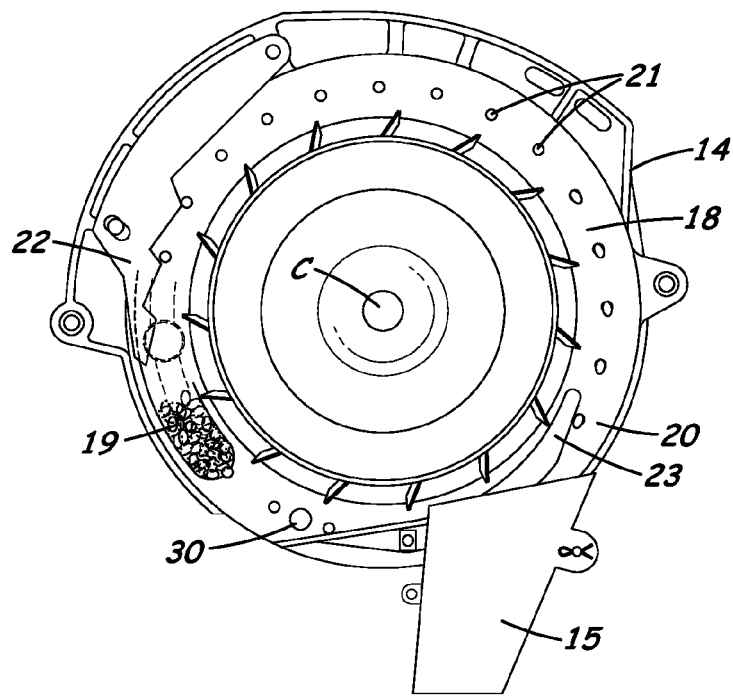
FIG. 18 is a cutaway view showing an alley wiper located on a backside of the seed plate for selectively cutting off vacuum through the seed plate holes moving past the alley wiper to prevent seeds from being carried out of the seed chamber by the seed plate.

The alley wiper 39 mentioned above is shown in a cutaway view of the seed meter assembly in FIG. 18. The alley wiper 39 is located on the backside of the seed plate 18 for selectively cutting off vacuum through the seed plate holes 21 moving past the alley wiper 39 to prevent seeds from being carried out of the seed chamber 19 by the seed plate 18. The alley wiper 39 is used to provide a precise control of when the seeds are loaded onto the seed plate 18 so that a precise number of seeds can be planted for each plot and so that an alley with no planted seeds can be created in the field between each plot. The alley wiper 39 stays on while the new seeds fall into the seed chamber 19, thereby ensuring a crisp starting point for all of the plots.

Figure 19:
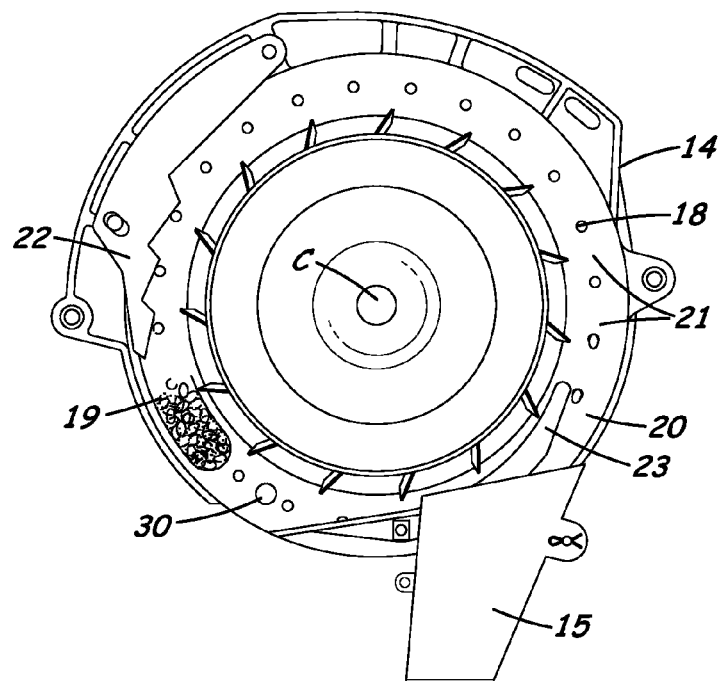
FIG. 19 is an illustration showing new seeds loaded and carried on the seed plate while the last of the previous seeds are still being carried on the seed plate to the release point.

Once the new seed loading process is complete, the alley wiper 39 is deactivated, and the new seed is picked up and carried by the seed plate 18 at a precise starting point on the seed plate, as shown in FIG. 19. At this point, the last of the previous seeds are also still being carried on the seed plate 18 to the release point 20.

Figure 20:
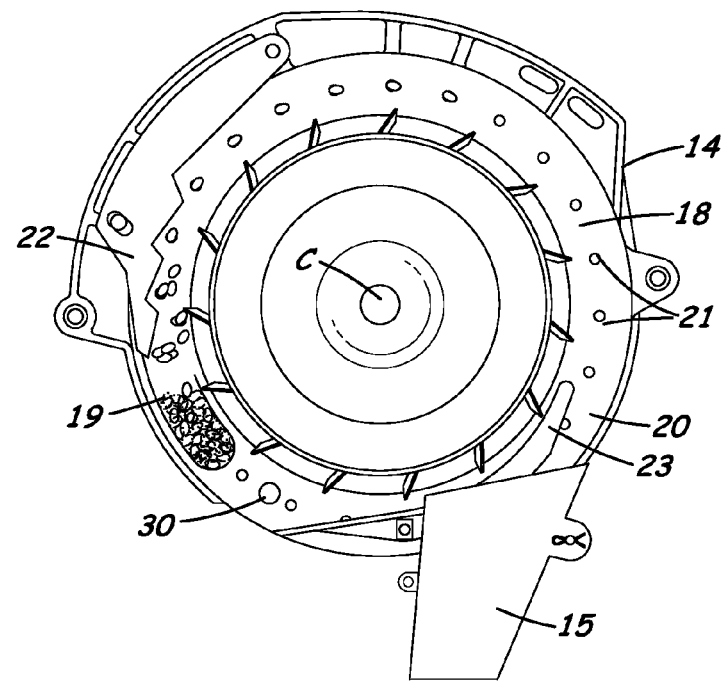
FIG. 20 is an illustration showing the new seeds loaded onto the seed plate following several empty seed pockets on the seed plate that allow the seed plate to be sped up to shorten the alley to the desired width.

FIG. 20 shows the seed plate 18 after the last of the previous seeds have been released and the new seeds are being loaded onto the seed plate 18 with several empty seed pockets 21 between the first of the new seeds and the release point 20. At this time, the seed plate 18 can be sped up to cause the first of the new seeds to reach the release point 20 sooner. This is achieved by controlling the valve 28 associated with the hydraulic motor 24 to increase the hydraulic flow to the motor 24 and speed up the rotation of the seed plate 18. By increasing the rotation speed of the seed plate 18, an alley narrowing function is provided in which the new seeds on the seed plate 18 can be advanced to the drop off point 20 quicker, thereby shortening the alleyway to a precise desired width.

Figure 21:
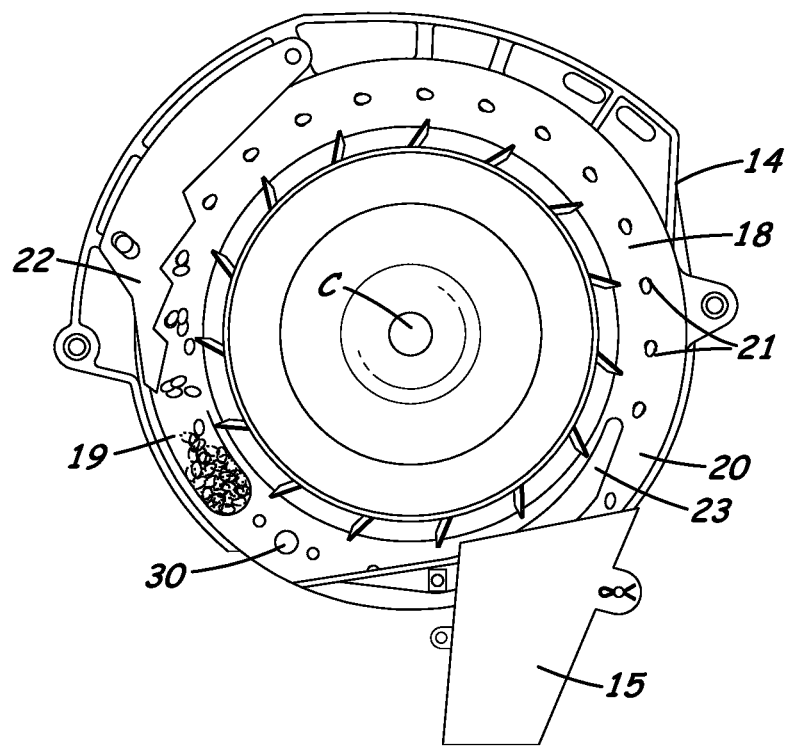
FIG. 21 is an illustration showing the new seeds being loaded onto the seed plate from the seed chamber and being dropped at the release point into the seed tube.

Before or at the instant when the first of the new seeds reaches the release point 20, the seed plate 18 is slowed again to the rotation speed required to produce the desired seed spacing and planting population for the current plot. The new seeds then continue to be dropped into the seed tube 15 at the release point 20, as shown in FIG. 21. The planter continues through the field until the desired number of seeds have been loaded onto the seed plate 18 for the current plot, at which time the process described above repeats again.

The planter functions described above are programmed into the microprocessor controller 33 so that the functions occur in a precise sequence based on the position of the planter in the field. The microprocessor controller 33 is also programmed to ensure that the desired rotational position of the seed plate 18, as determined by the optical sensor 30, is precisely matched to the position of the planter 10 in the field 12.

The controller 33 compensates for the speed of the planter 10 to get the alleyways to line up regardless of the speed driven. By dissecting the geometry of the seed meter 14 and correlating the position of the seed plate 18 with the position of the planter on the ground, the controller 33 can determine precisely when to turn the gate 37, alley wiper 39, evacuation line 36, etc. on and off. For example, when there are enough seeds on the seed plate 18 to finish planting a plot, the evacuation function using the evacuation line 36 will turn on. The controller 33 is also programmed to compensate for the delay time from when the controller 33 sends the signal to evacuate, the electric pulse goes down the wire to the valve, the valve opens, and the air starts to flow through the evacuation line 36 to actually start to evacuate the seed. The alley wiper 39 turns on when the controller 33 determines that the last seed should be clearing the alley wiper 39 based on the geometry and the speed of the seed plate 18, which is based on the ground speed.

The controller 33 is also programmed to compensate for the time needed for the seed to fall from the staging gate 37 to the pick up point in the seed chamber 19. The controller 33 determines how far the seed plate 18 travels while the alley wiper 39 is on and calculates how fast to rotate the seed plate 18 within the alleyway to achieve an alleyway of the width desired by the researcher.

If the researcher tries to input a plot parameter that is beyond the capability of the planter to perform correctly, the computer program will display an error message. This is a substantial improvement over prior art systems that required the researcher to try various things to see if they worked before deciding whether to include them in the field layout. With the present invention, the researcher tells the controller 33 what he or she wants using the field layout system described herein, and the controller 33 either does it or displays an error message requiring a different plot parameter before planting starts.

A research plot field layout system according to the invention will now be described with reference to FIGS. 22 to 35 of the drawings.

The field layout system comprises a computer program loaded onto a computer that can be used to create a field layout for a seed research field. The field layout created by the system is used to control the operation of the plot seed planter while the planter is being used to plant the desired seed plots in the research field. The field layout system allows a researcher to layout the research field from the comfort and convenience of the researcher's office before arriving at the field with the plot planter.

Figure 22:
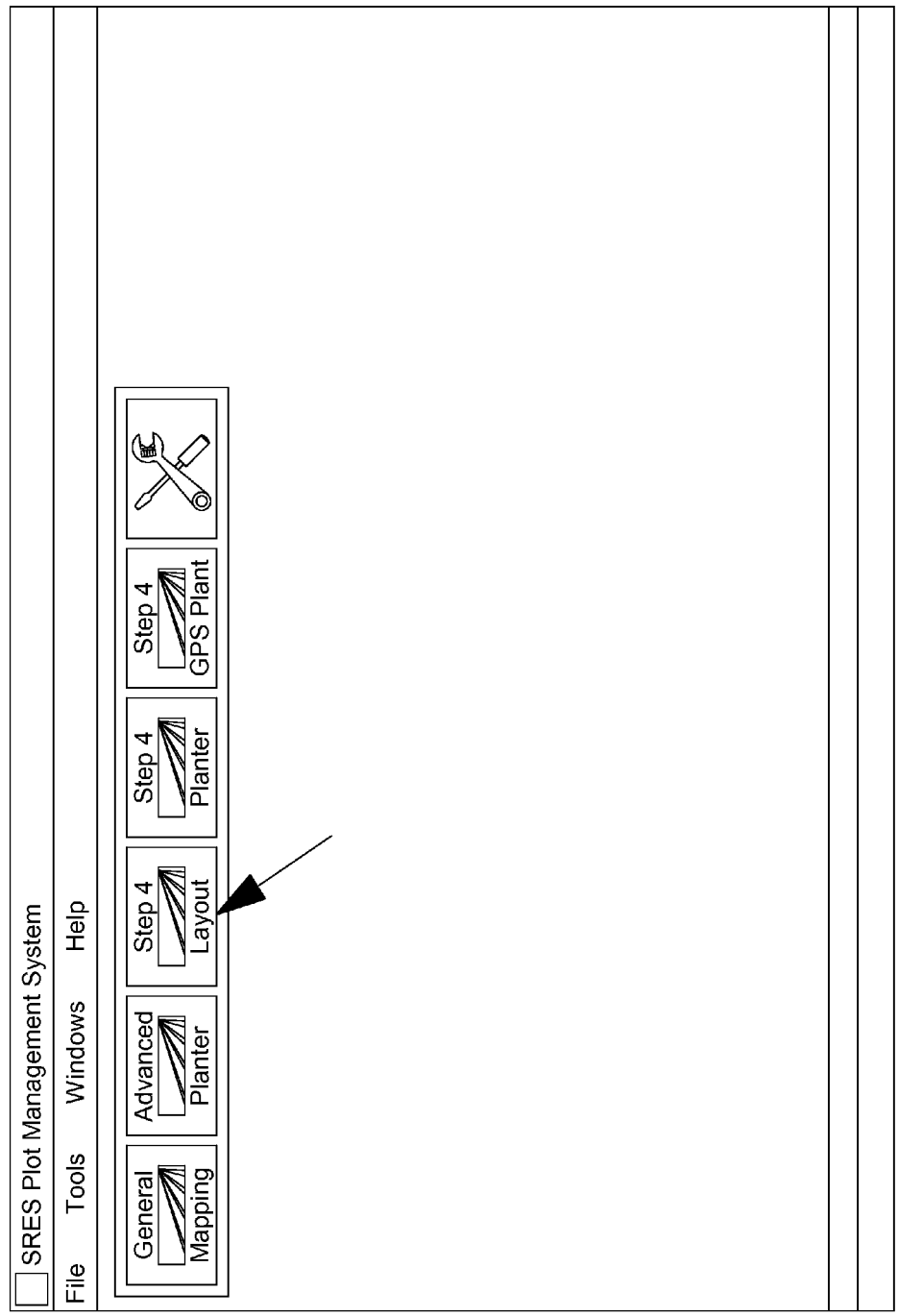
FIG. 22 is a screen print showing a main menu selection of a computer program for providing plot layout and planter control functions according to the present invention.
Figure 23:
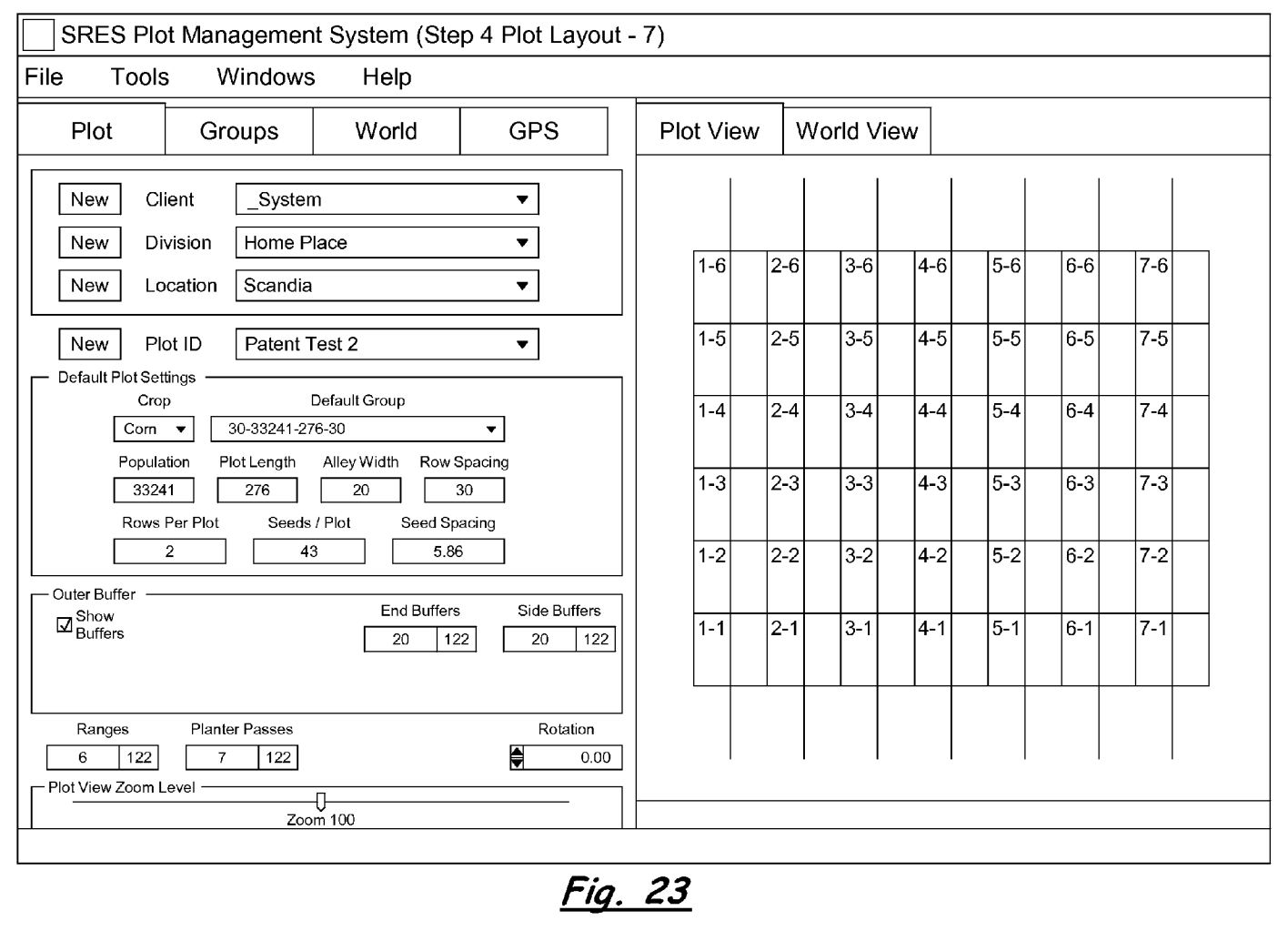

The field layout program is selected from a main menu of the computer program, as shown in FIG. 22. The field layout program then proceeds to a plot layout screen, as shown in FIG. 23, which allows the researcher to input a number of ranges and planter passes for the research field. Once this information is entered, a schematic of the plot is displayed as a matrix with numbers assigned to each plot indicating the range and pass number for the plot. The centerlines for each planter pass through the field are also displayed.

As indicated in FIG. 23, additional information can be entered for the research field, including the dimensions of the end and side buffers around the edge of the research field (the buffers separate the research field from the surrounding agricultural field).

Figure 24:
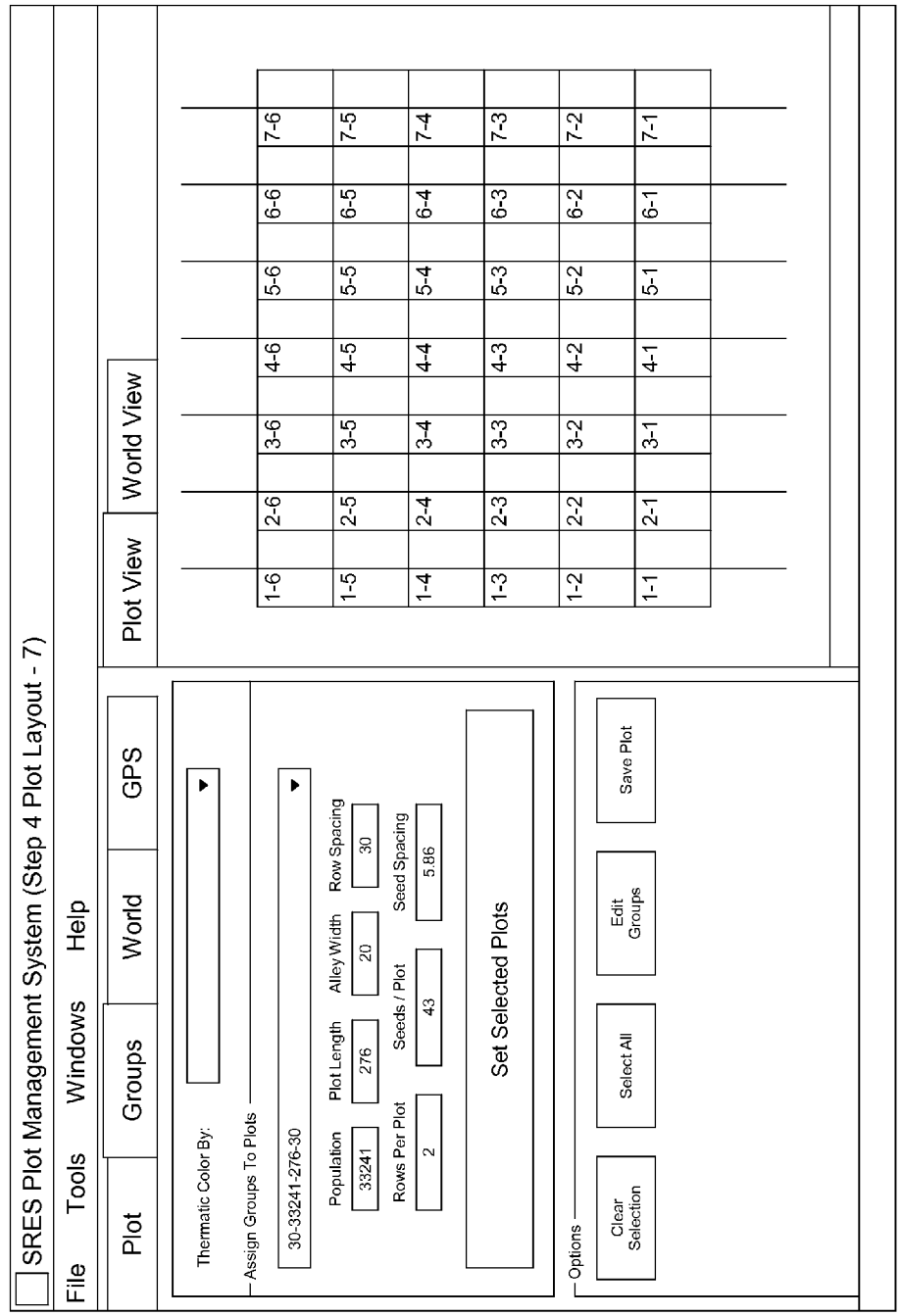
FIG. 24 is a screen print displayed by the computer program showing a function for setting up plot groups and defining the parameters of each plot group.
Figure 25:
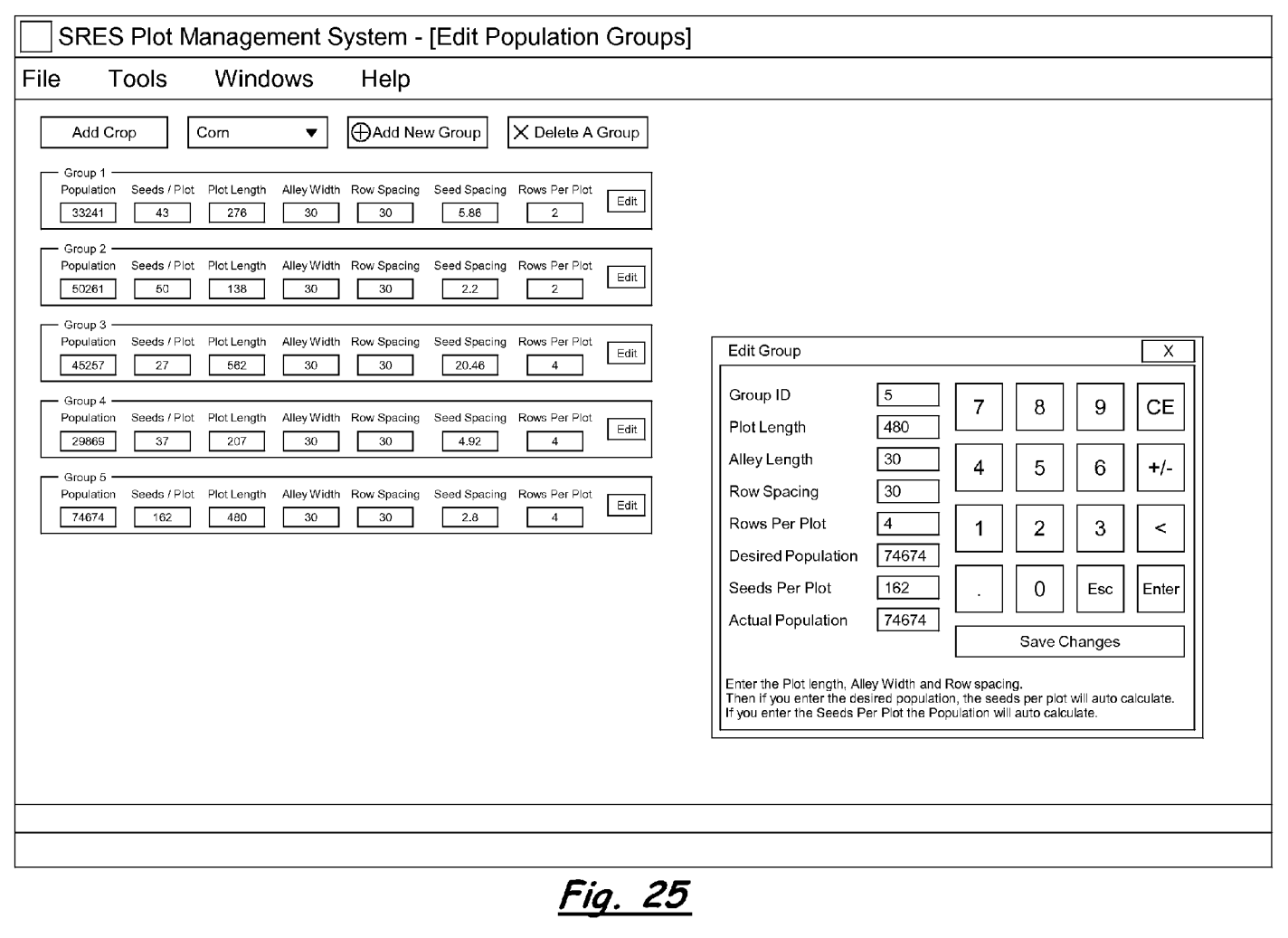
Figure 26:
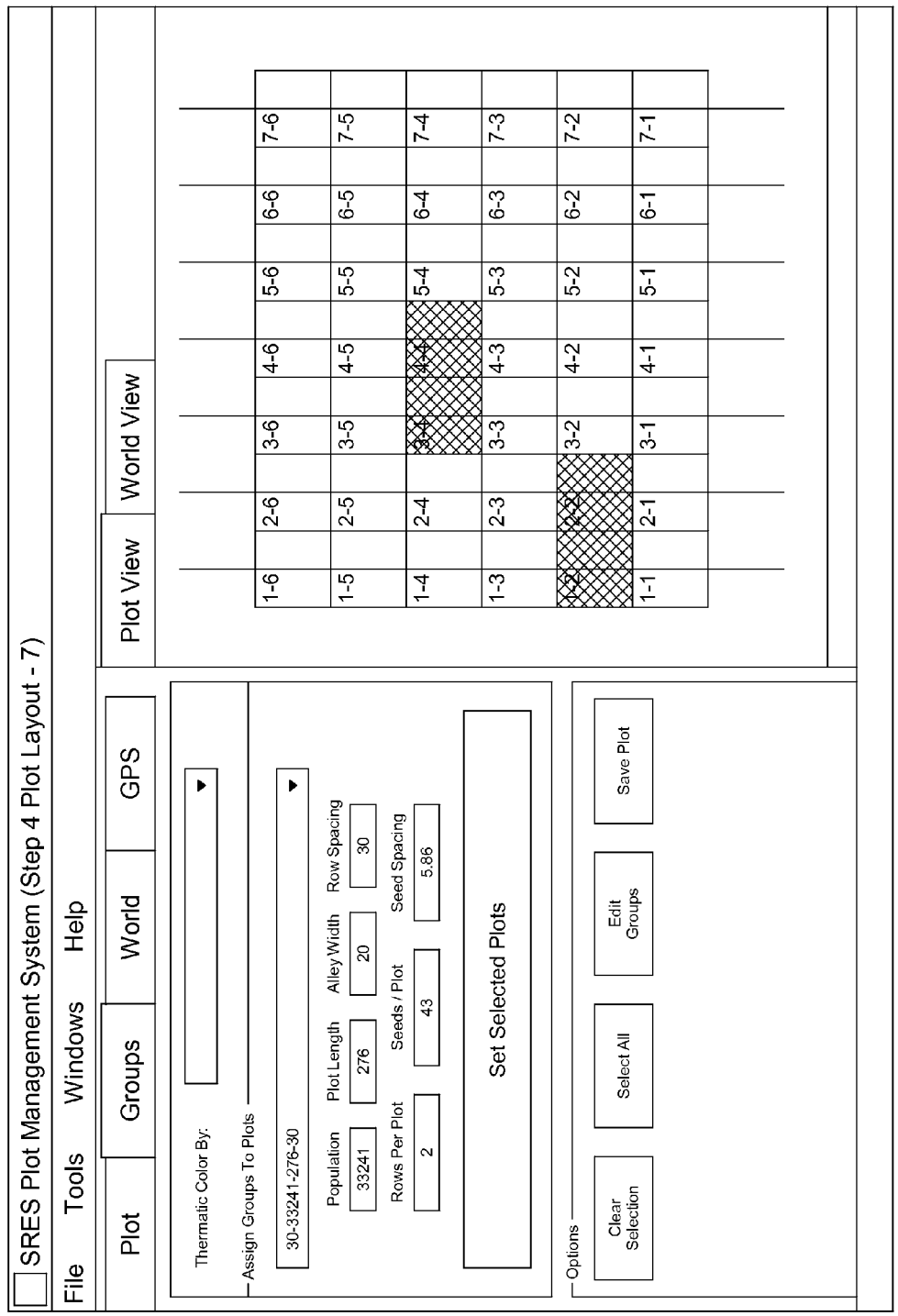
FIG. 26 is a screen print displayed by the computer program showing a process of assigning predefined groups to each selected plot in the plot layout.

In addition to defining the initial parameters of the field, the researcher will also define parameters for various plot groups to be included in the research field. As shown in FIGS. 24 and 25, each plot group can be defined by the researcher to have, for example, a specific seed population, plot length, alley width, and number of rows. The researcher can either enter the desired population for the plot or the number of seeds per plot, and the program will automatically calculate the other based on the plot length. Other parameters, such as the row spacing, will typically be fixed by the planter and will remain the same throughout all of the plots in the research field.

Once the plot groups are defined, the program will use one of the plot groups as the default group that is initially assigned to all of the plots in the field. The researcher can then assign a different group to each plot by selecting the plots from the display in FIG. 26, and then selecting a specific group to assign to the plot from the drop down list of groups on the same display. The researcher can assign different group parameters to each plot in the field, if desired. However, since most research fields include substantial repetition among the plots, the researcher will normally assign a particular group to several of the plots in the field.

Figure 27:
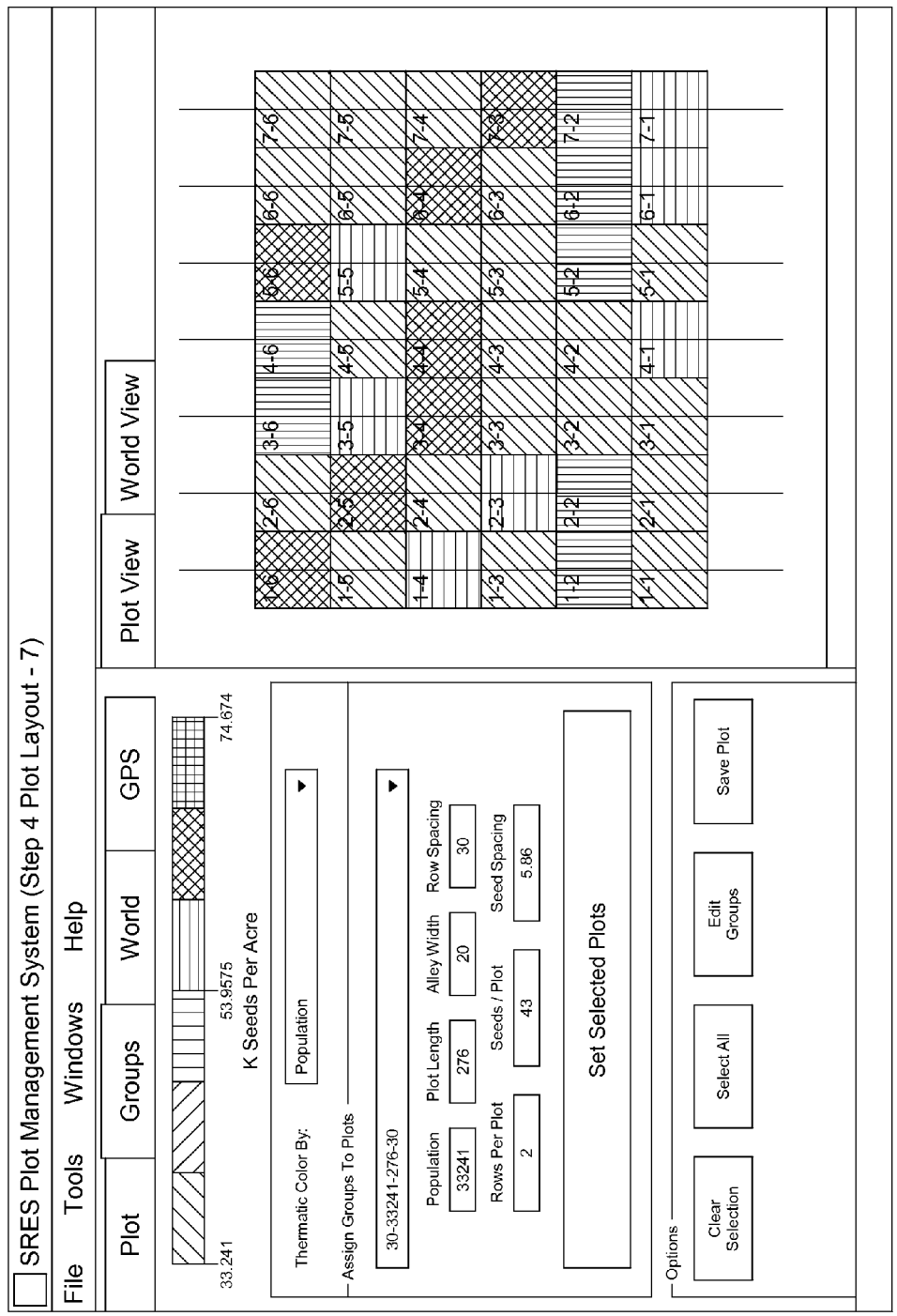
FIG. 27 is a screen print displayed by the computer program showing a thematic color display function for selected group parameters contained in the plot layout.

Once the groups have been assigned to plots, the program can be used to provide a thematic color display of the plot field layout, as shown in FIG. 27. The thematic color display can be set to provide a visual indication of the differences among the plots in the field layout. For example, the display can be set to show differences in seed populations, plot lengths, alley widths, and/or rows per plot.

Figure 28:
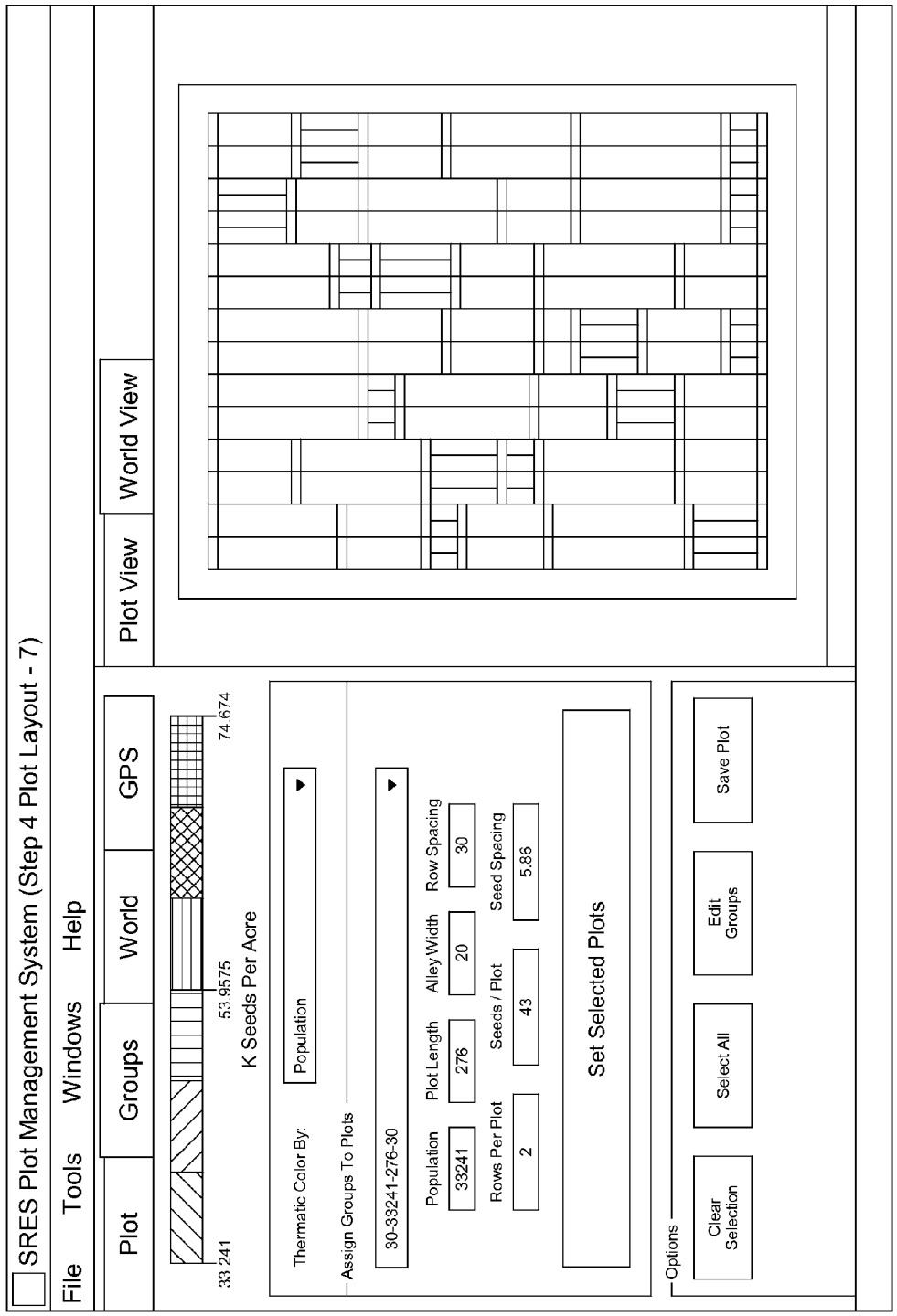
FIG. 28 is a screen print displayed by the computer program showing an arrangement of plots contained in the plot layout and showing different plot lengths and number of rows defined for the plots.

The program also provides a "world view" in FIG. 28 of the plot layout, which shows the different plot lengths, alley widths, rows per plot and buffer areas around the research plot field.

Figure 29:
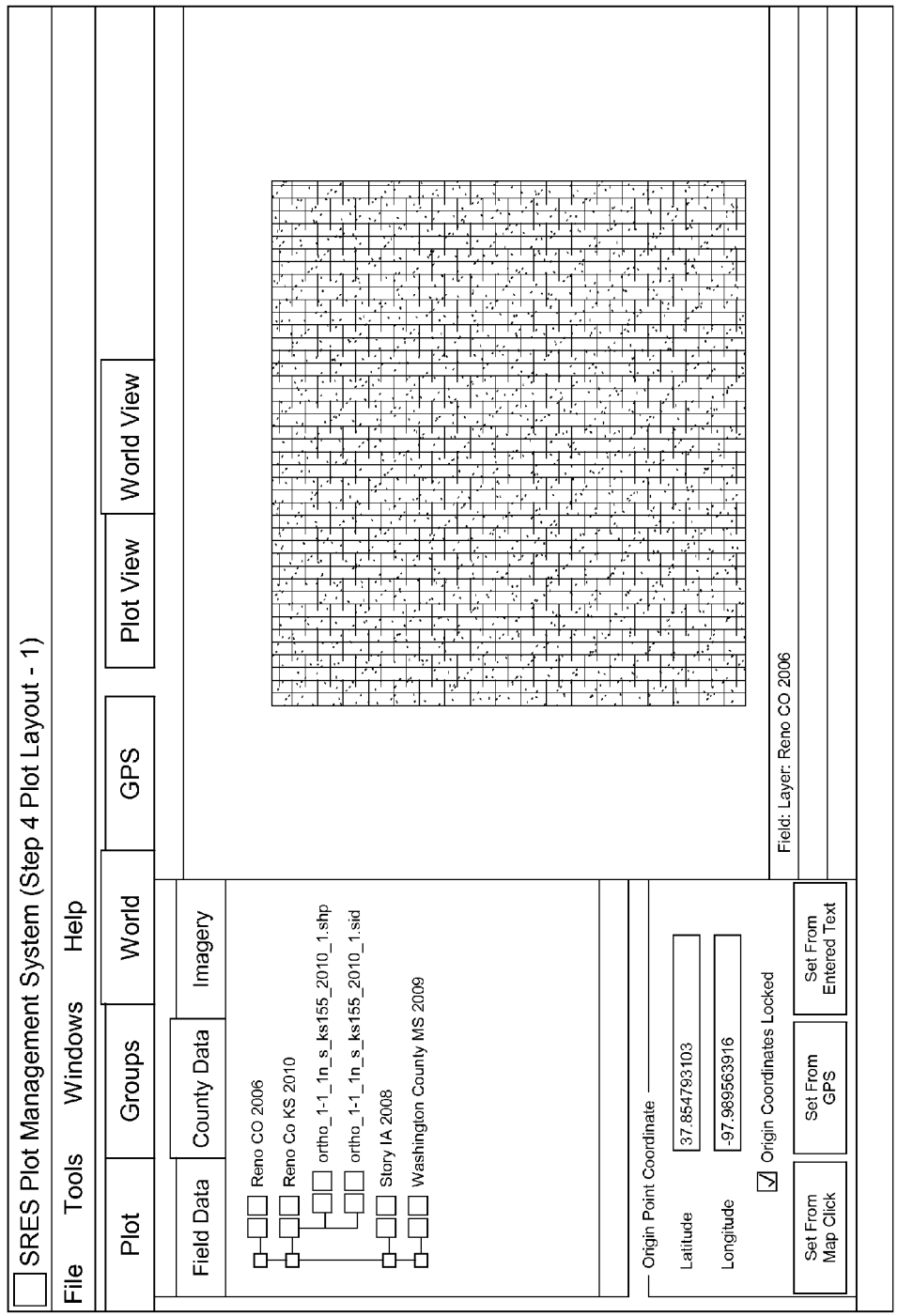
FIG. 29 is a screen print displayed by the computer program showing a georeferenced map of a wide area used to locate the plot layout at a desired field location.

The program allows georeferenced satellite image data to be associated with the research plot field so that the field layout can be precisely positioned on a selected field site. The image data can be acquired from a publically available ortho imagery database, such as the database provided at the U.S. Department of Agriculture website. The image data file may cover, for example, an entire county as shown in FIG. 29.

Figure 30:
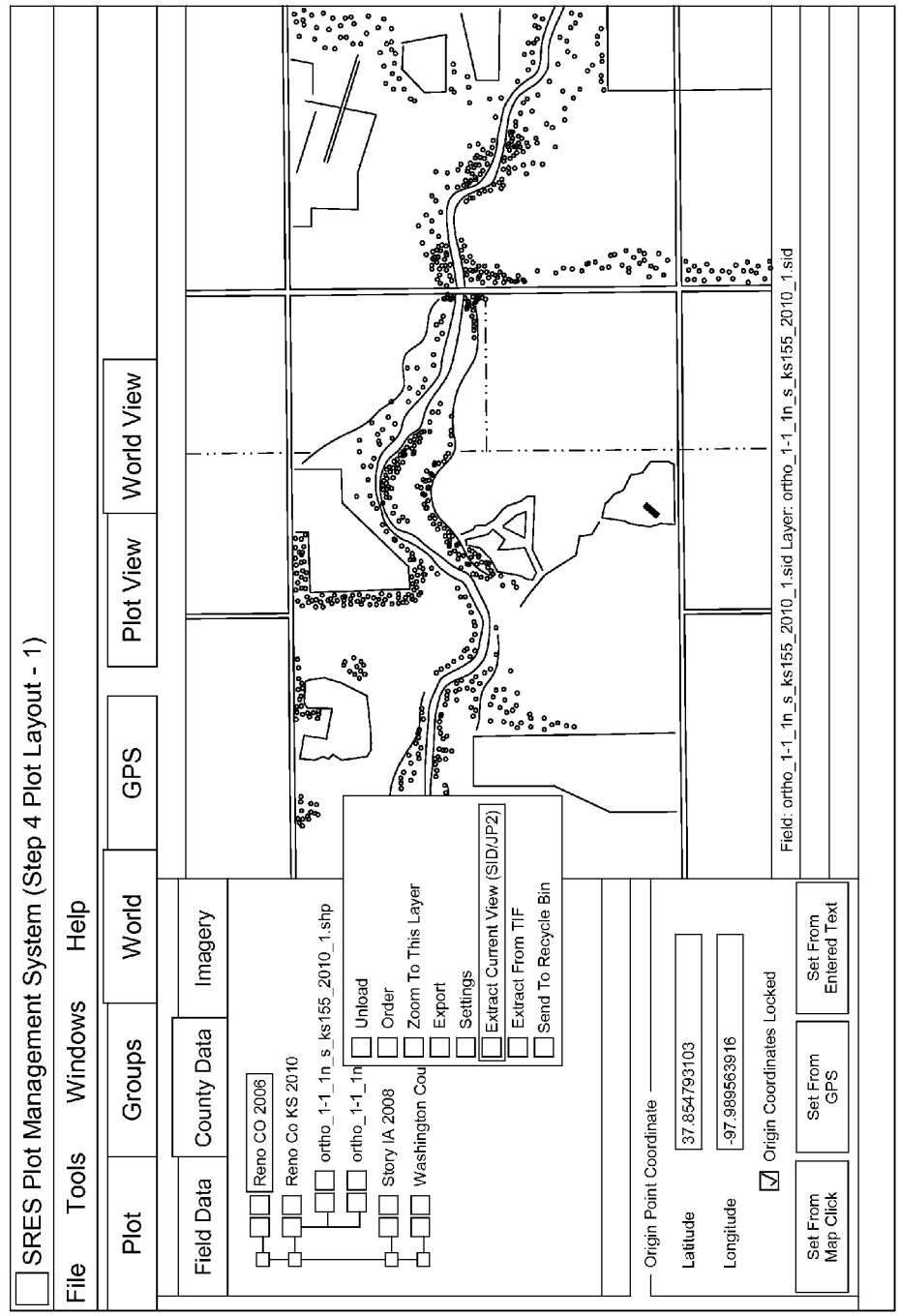
FIG. 30 is a screen print displayed by the computer program showing a zoomed-in view of the georeferenced map with the desired field location.
Figure 31:
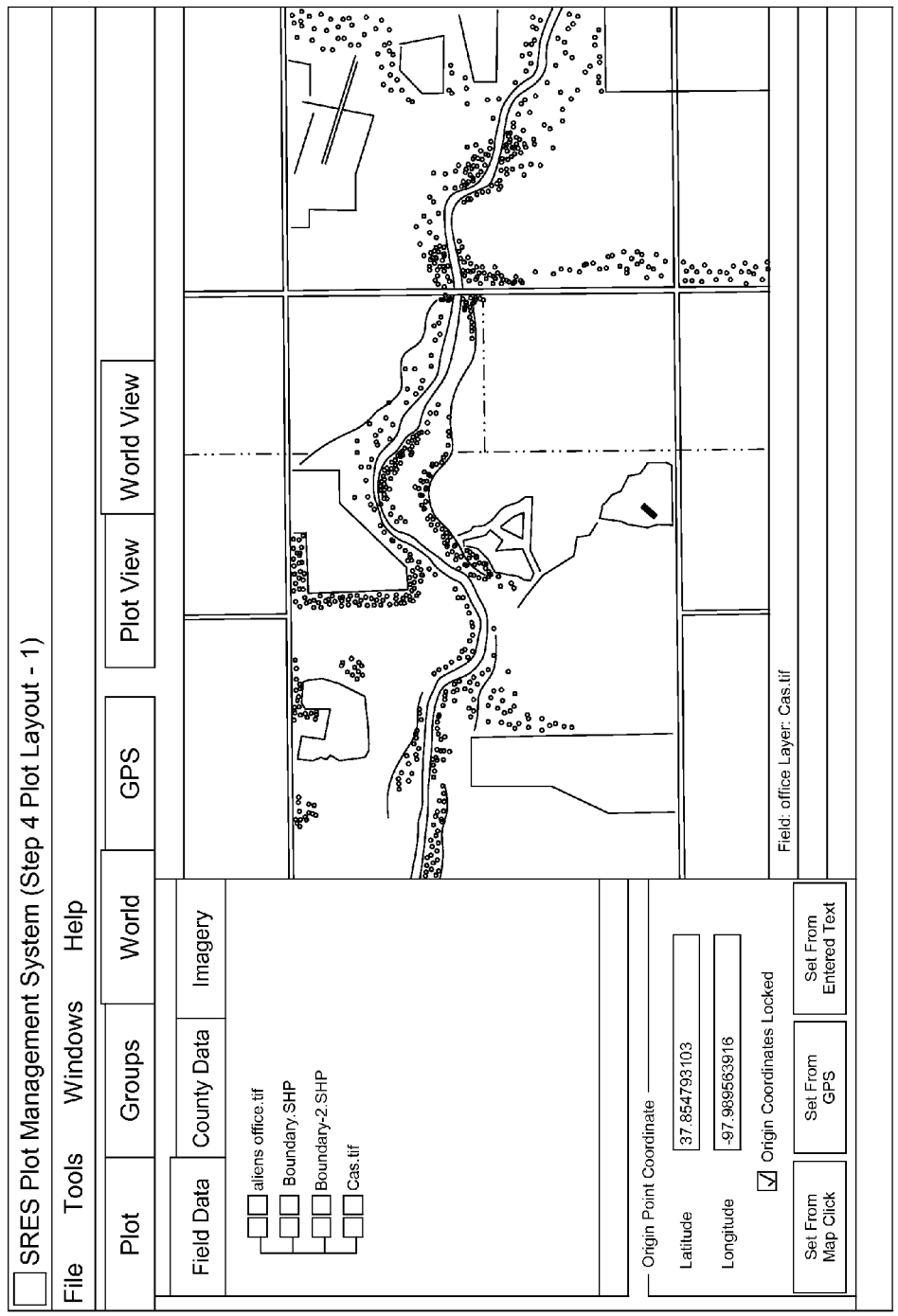
FIG. 31 is a screen print displayed by the computer program showing another view of the georeferenced map with the plot layout located thereon.

The researcher can then drill down for a closer view of the desired field location, as shown in FIG. 30. A zoom function is provided on the display to allow the researcher to zoom in on a selected point on the map. The field layout is shown as just a tiny spot in the map views of FIGS. 30 and 31. As indicated in FIG. 30, the current view of the map can be extracted so that only the image on the screen is saved with the plot layout location. The extracted view of the map is then saved as a separate file under the field data tab.

Figure 32:
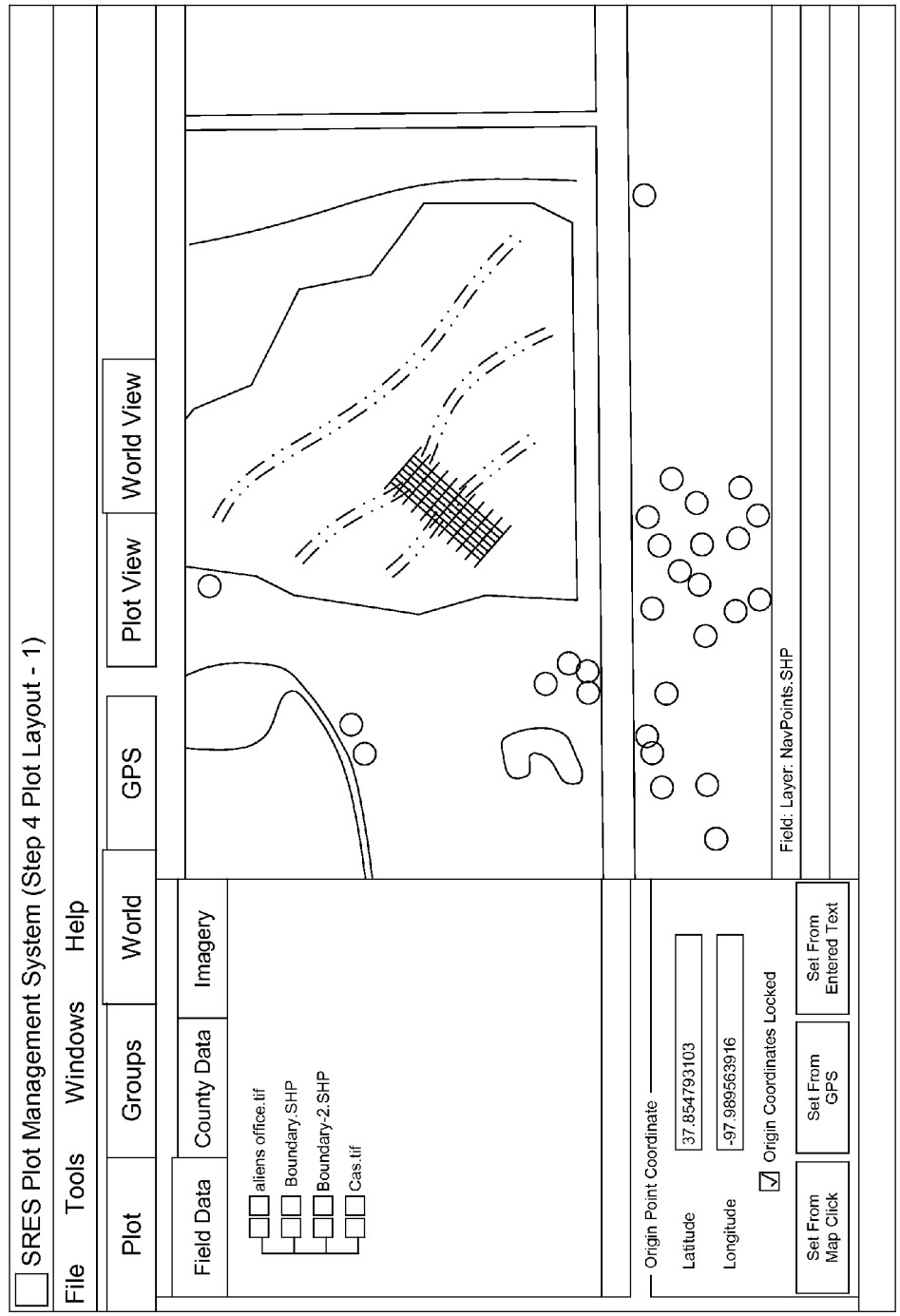
FIG. 32 is a screen print displayed by the computer program showing a further zoomed-in view of the georeferenced map with the plot layout located thereon.

FIG. 32 provides a still closer view of the field layout on the map view by zooming in closer on the extracted view of the map. The origin coordinate locked box can then be unchecked, as indicated in FIG. 32, to allow the origin to be relocated on the map.

Figure 33:
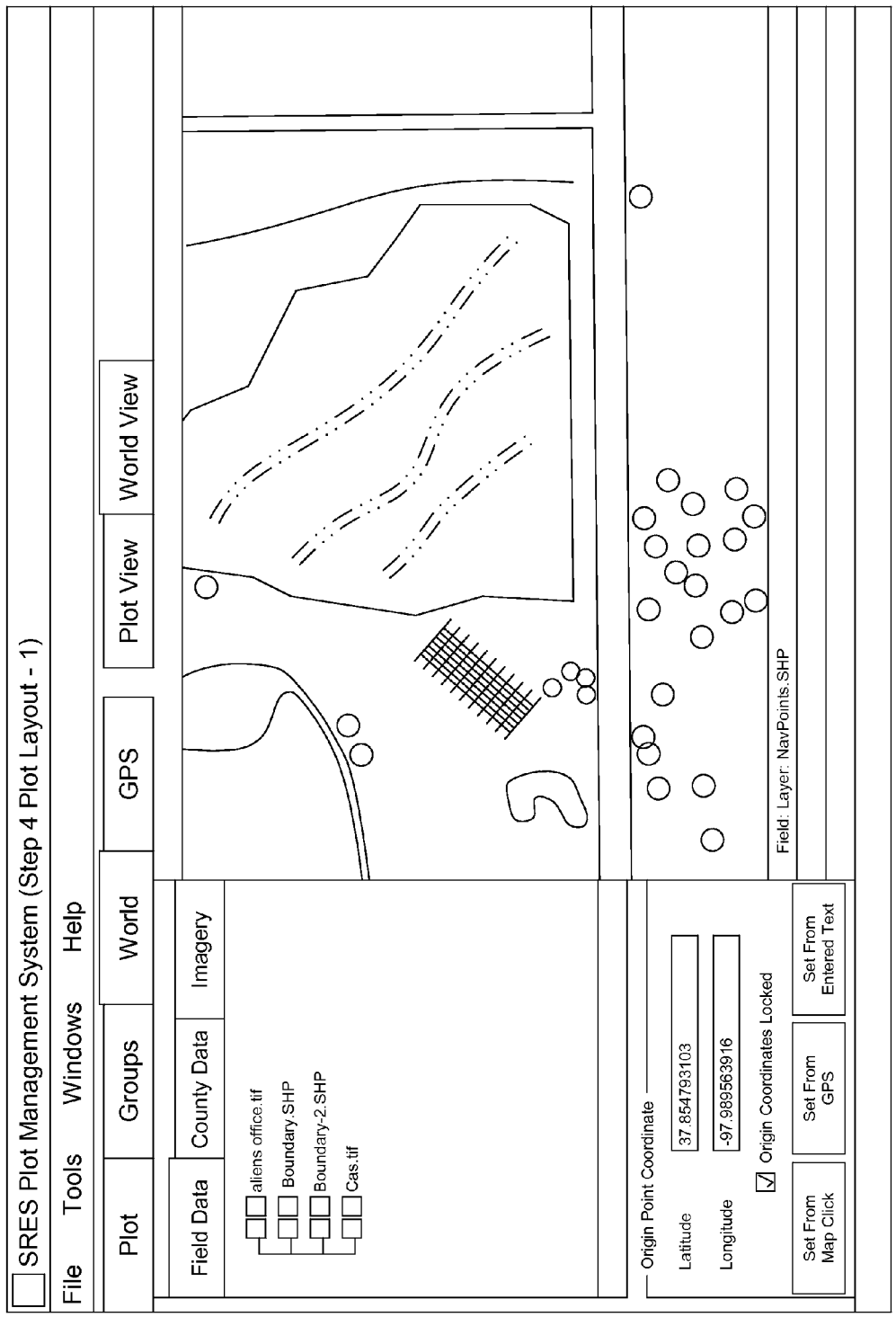
FIG. 33 is a screen print displayed by the computer program showing the plot layout being repositioned on the georeferenced map by selecting a new origin point coordinate.

As shown in FIG. 33, the plot layout can be repositioned on the georeferenced map by selecting a new origin point coordinate. The new origin point can be set by (1) using a map click function to select the origin point on the map, (2) using a GPS receiver at the field location to mark an origin point, or (3) manually entering the latitude and longitude coordinates of the origin point. For example, by clicking on the map click button the researcher can then click on the map where the origin for the plot field is desired, and the program will move the origin to that new point, as shown in FIG. 33.

Figure 34:
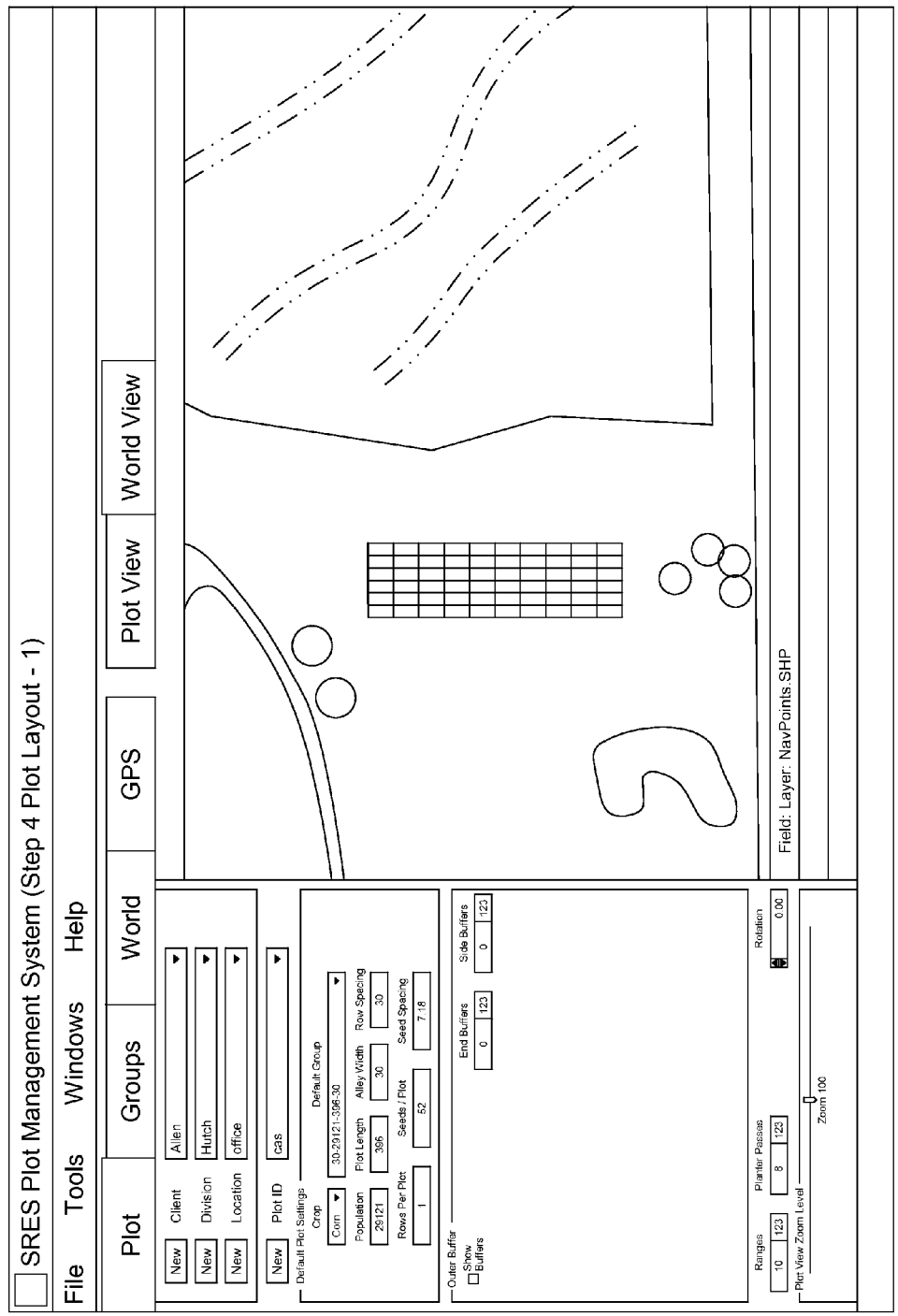
FIG. 34 is a screen print displayed by the computer program showing the plot layout being rotated to a new position on the georeferenced map by changing a rotation angle setting.
Figure 35:
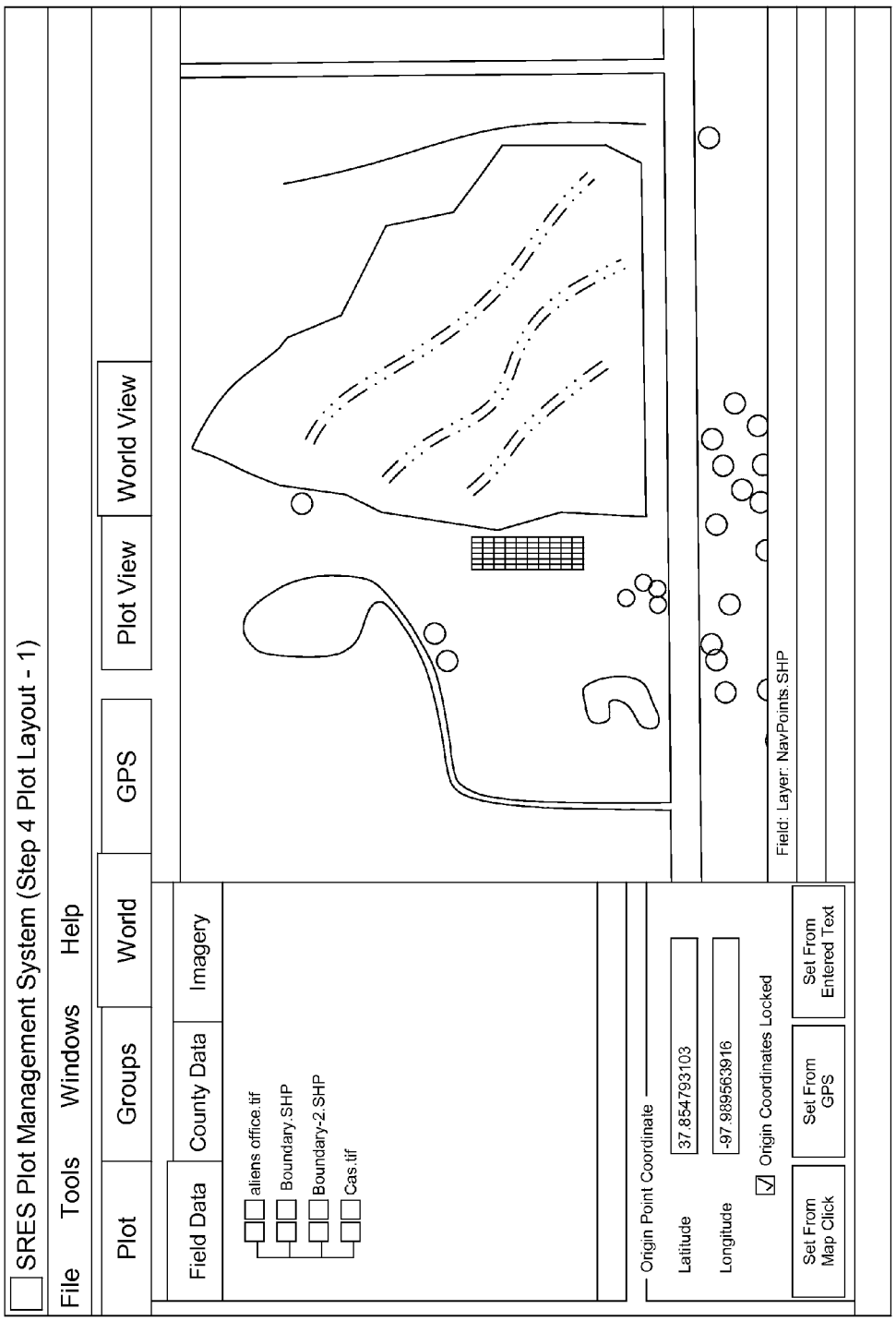
FIG. 35 is a screen print displayed by the computer program showing the plot layout with the new rotation angle repositioned on the georeferenced map in a final position.

As shown in FIG. 34, the plot layout can also be rotated to a new position on the georeferenced map by changing the rotation angle setting. FIG. 34 shows the rotation angle setting being changed to 0.00, which places the field layout with the rows going straight north from the origin point. The researcher can go back and forth adjusting the origin and the rotation angle until the field layout is positioned exactly where researcher wants the plot field to be located. For example, the plot field can be lined up with a fence row and rotated to match the fence row, as indicated in FIG. 35. The completed field layout can then be stored on the computer or on a portable memory device for use by the researcher at planting time.

As described above, the field layout system of the present invention allows the researcher to mix and match plot lengths, seed population, and number of rows per plot when laying out the research plot field. The system allows complicated and/or randomized plot layouts with different parameters to be created and graphically represented in the researcher's office in advance of planting, so that all of the plots can be planted in an efficient and organized manner when the planter arrives at the field. The thematic color displays provided by the system also give the researcher a convenient and useful visual indication of the different plot variables across the research field. A GPS plant function associated with the field layout system according to the invention will now be described with reference to FIGS. 36 to 40 of the drawings.

The GPS plant function is the part of the computer program that allows the field layout system to be used to control a seed research plot planter. Specifically, the GPS plant function operates to cause the plot planter to plant individual seed plots according to the parameters defined by the researcher with the field layout system described above.

Figure 36:
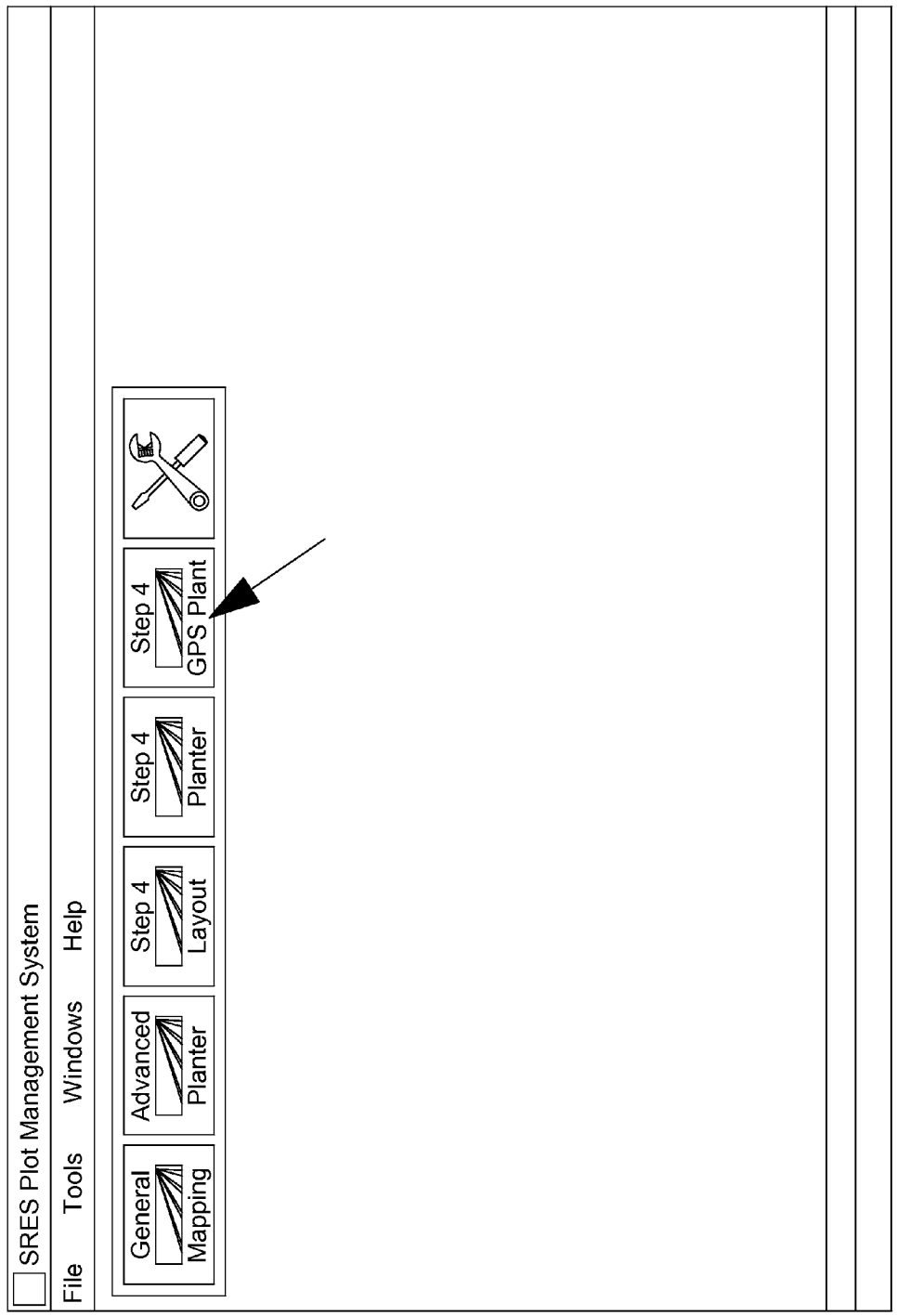
FIG. 36 is a screen print showing a GPS plant function being selected from the main menu selection of the computer program.
Figure 37:
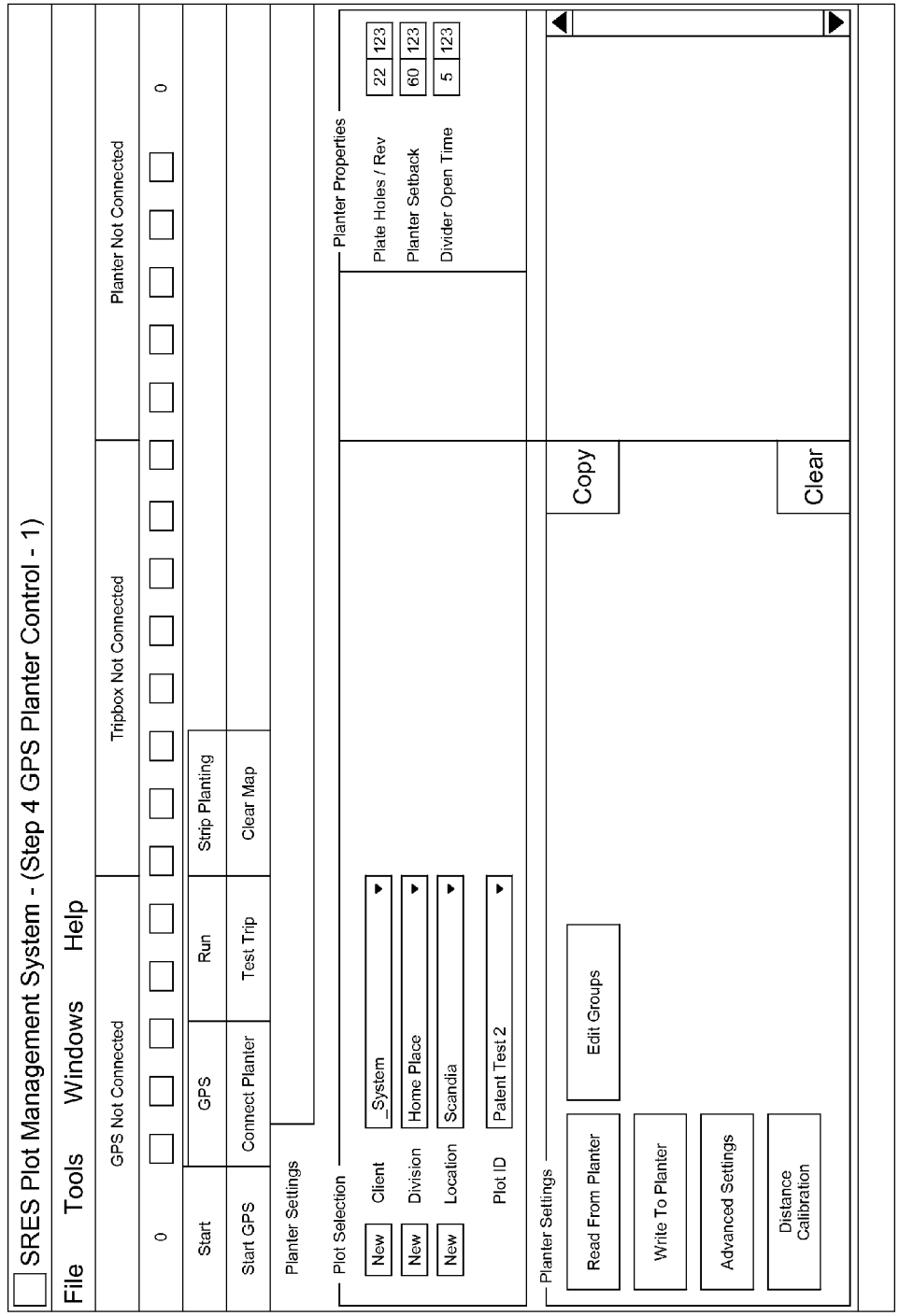
FIG. 37 is a screen print showing a start screen with a planter settings function of the computer program for inputting certain parameters of the planter, such as the number of holes in the seed plate, the planter setback distance, and the divider open time.

The GPS plant function is selected from the main menu of the computer program, as shown in FIG. 36. The GPS plant function then proceeds to a start screen with a planter settings input screen, as shown in FIG. 37. The planter settings screen is used to enter certain parameters of the planter, such as the number of holes in each seed plate, the "planter setback distance," and the divider open time.

The planter setback distance refers to the distance between the GPS receiver and a predetermined location on the planter, such as the location where the seed exits the planter. For example, if the GPS receiver is placed on the cab of the tractor 11 pulling the planter 10, and the distance (in the direction of travel) between the GPS receiver and the lower end of the seed tube 15 of the planter row unit 13 is 100 inches, then a planter setback distance of 100 inches can be entered into the planter settings input screen.

A computer algorithm can be used to create an adjustment factor for the setback distance to compensate for variations in the speed of the planter. For example, if the speed sensor associated with the planter determines that the planter is traveling at a predetermined speed (e.g., 2 mph), the planter setback distance can be used as entered in the planter settings input screen without any adjustment factor. If the planter is traveling at a speed (e.g., 4 mph) greater than the predetermined speed, the setback distance can be adjusted slightly lower (e.g., subtract 3 inches) to compensate for the greater distance traveled by the planter from the time signals are generated until the seed meter 14 responds to the signals. If the planter is traveling at a speed less (e.g., 1 mph) than the predetermined speed, the setback distance can be adjusted slightly higher (e.g., add 2 inches).

As described above, the entire sequence of loading plot seeds S, evacuating the seed chamber 19, operating the alley wiper 39, and rotating the seed plate 18 are all controlled automatically based on the sensed position of the seed plate 18 and the measured distance traveled by the planter 10. Accordingly, it is not necessary for the researcher to input a complicated set of operating parameters for the planter, such as the evacuation starting point, the load time, the alley wiper on and off times, the starting point for the seed plate rotation, and so forth. The setup and operation of the plot planter with the present invention is much simpler than what was required with the prior art.

Figure 38:
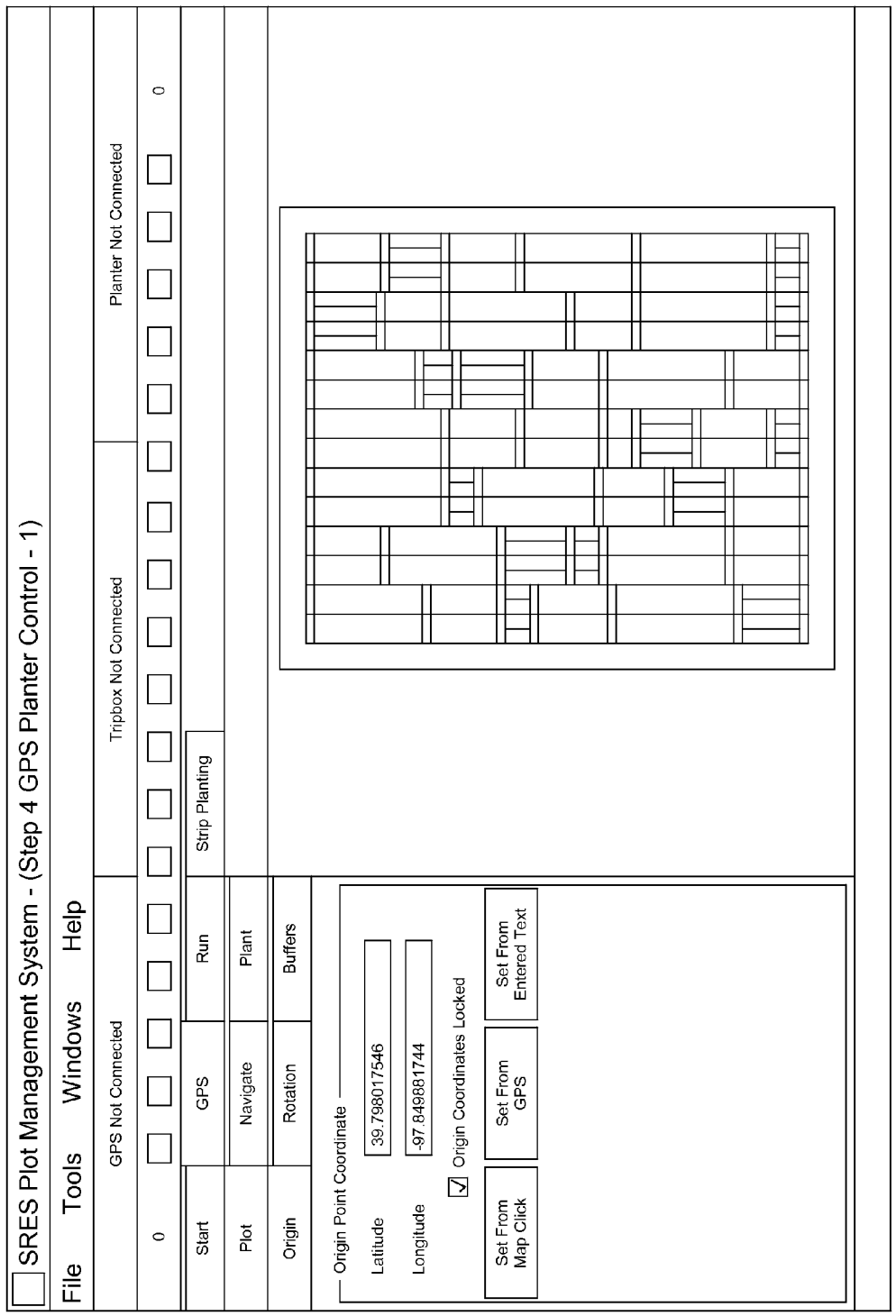
FIG. 38 is a screen print showing a GPS setup function that allows the origin and rotation of the field layout to be readjusted by a researcher once the planter arrives at the field.

Once the planter settings are input into the system, the researcher can then select the GPS setup function, as shown in FIG. 38. The GPS setup function allows the origin and rotation of the field layout and the field buffers to be reset or adjusted by a researcher once the planter arrives at the field. The origin point can be set in a manner similar to the process used in the field layout program (i.e., from map click, from a GPS receiver, or by manually entering the coordinates). The rotation angle and field buffer dimensions can also be set or adjusted by manually entering the desired settings. The field layout displayed on a plain background in FIG. 38 can also be displayed as an overlay on the georeferenced map associated with the field location by selecting the navigate function.

Figure 39:
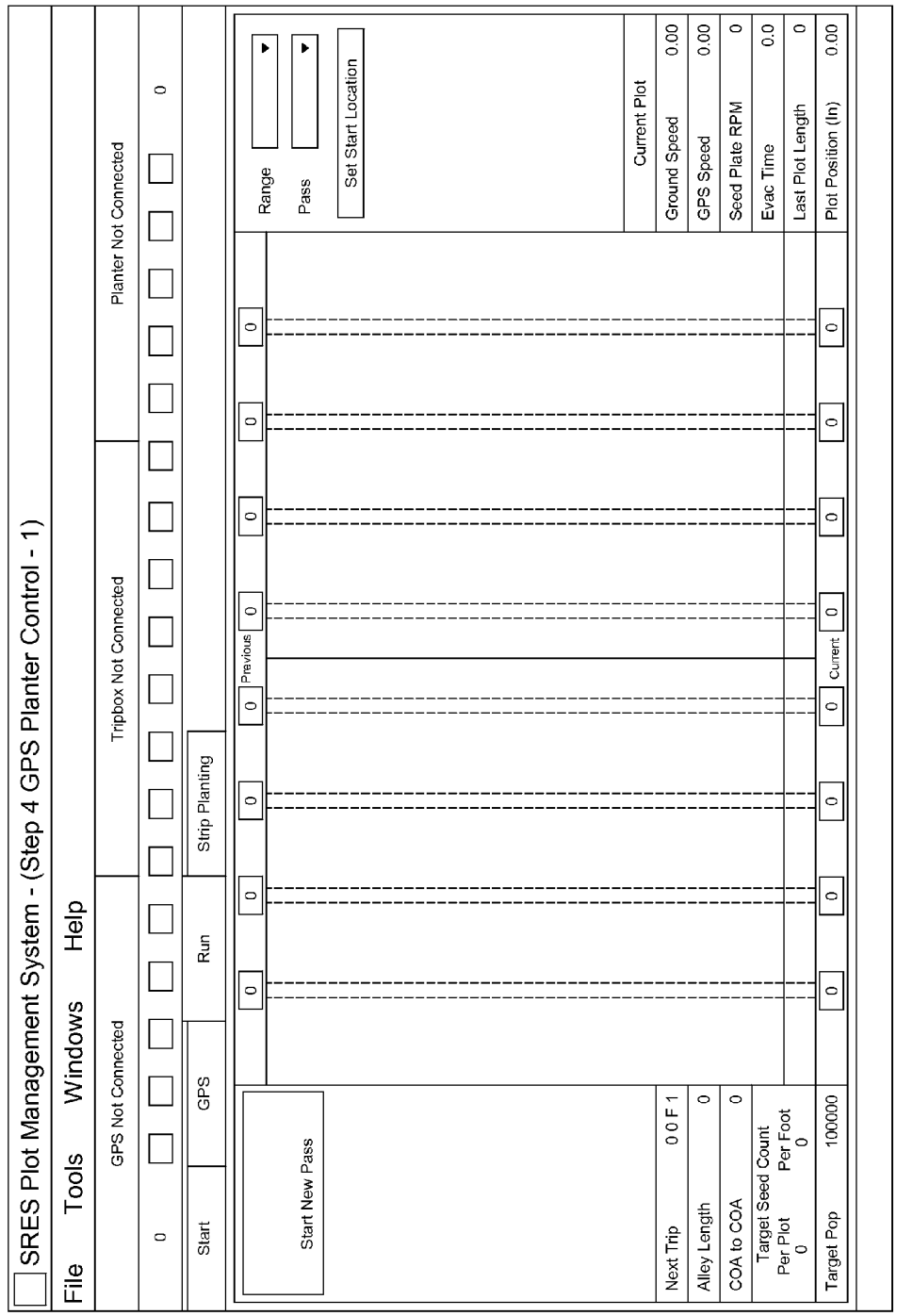
FIG. 39 is a screen print showing a graphical depiction of each plot as the plot is being planted.

With the planter settings input into the system and the GPS coordinates for the origin set, the planter is then ready to start planting. A run screen is shown in FIG. 39, which provides a researcher riding on the planter with a graphical depiction of each plot as it is being planted. The run screen shows on the lower left side information about what should be planting, such as the distance to the next trip location, the alley length, the target seed count, and the target seed population. The run screen also shows on the lower right side information about what is actually happening, such as the ground speed of the planter, the seed plate rotation speed, the evacuation time, the last plot length, and the current plot position.

Figure 40:
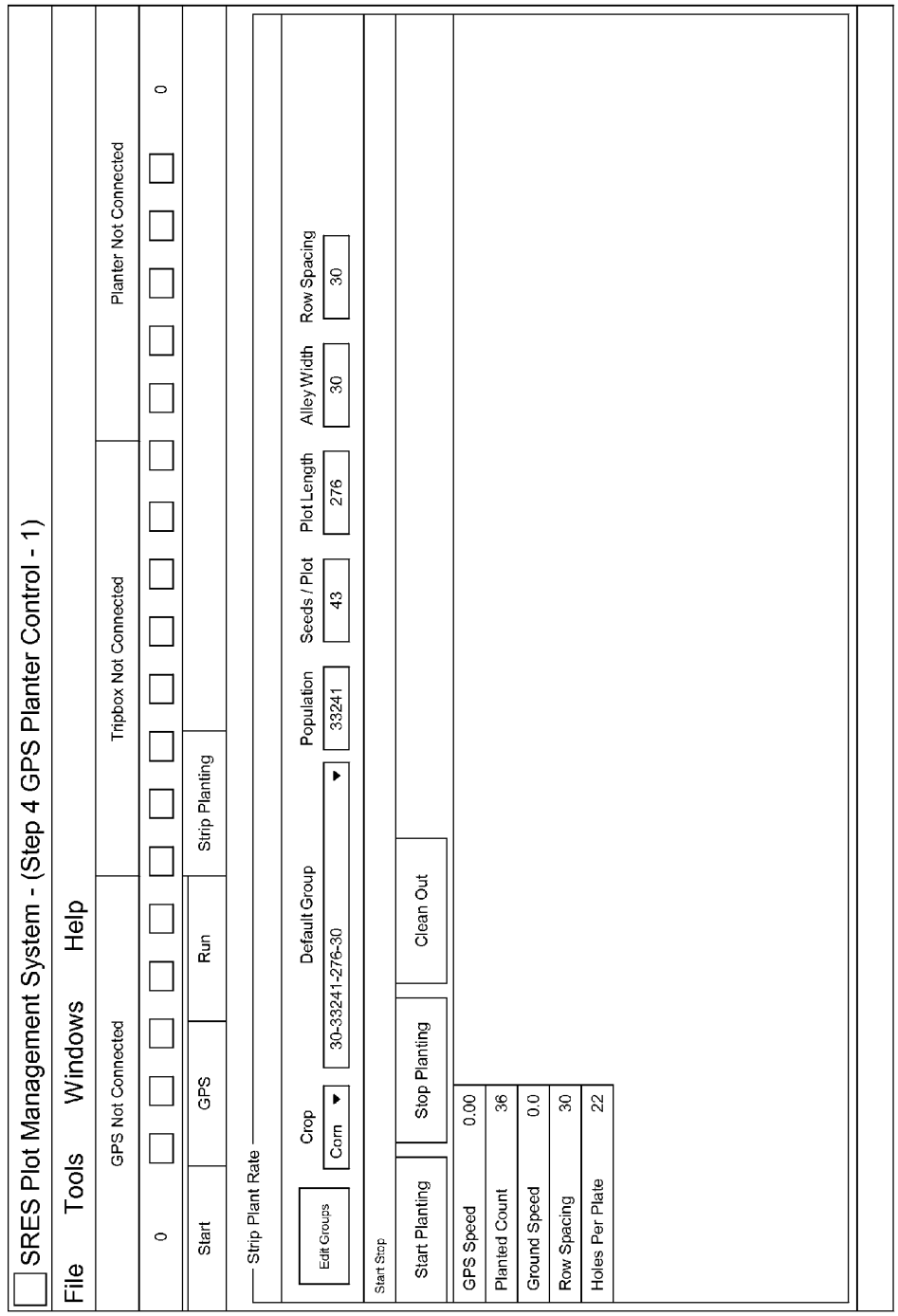
FIG. 40 is a screen print showing a strip planting function of the computer program in which the planter can be used as a commercial planter for planting seeds in strips without multiple plots for each pass through the field.

A strip planting function is also provided by the computer program, as shown in FIG. 40. The strip planting function allows the planter to be used as a commercial planter for planting seeds in strips without multiple plots being created for each pass through the field. The strip planting function allows the researcher to select a planting population from the preset groups created with the field layout system.

The invention has been described above in connection with a seed research plot planter. However, it should be understood by those skilled in the art that some of the features disclosed herein can also be used with commercial agricultural planters, such as the algorithm to adjust the planter setback setting based on the ground speed of the implement.

The field layout system disclosed herein can also be used in a research plot setting to control other implements, such as sprayers, fertilizer applicators, and harvesters. For example, the field layout system disclosed herein can be used to create a plot layout for testing different chemicals and application rates within a research plot, and for automatically controlling a sprayer applying the chemicals.

While the invention has been described in connection with specific embodiments thereof, it is to be understood that this is by way of illustration and not of limitation, and the scope of the appended claims should be construed as broadly as the prior art will permit.

What is claimed is:

1. A seed planter, comprising:
   a seed chamber for receiving seeds to be planted;
   a rotating seed plate that cooperates with the seed chamber to pick up and transport individual seeds from the seed chamber to a release point, where the seeds fall to the earth; and
   a sensor that detects the rotational position of the rotating seed plate.

2. The seed planter according to claim 1, wherein said seed plate comprises a plurality of symmetrically spaced apart holes arranged concentric with a center of the rotating seed plate, and wherein said sensor is an optical sensor that transmits and receives light through said holes as the rotating seed plate rotates relative to said sensor.

3. The seed planter according to claim 2, wherein said optical sensor is located after said release point and before said seed chamber relative to a direction of rotation of said rotating seed plate for transmitting and receiving light through said holes of said rotating seed plate at a point in which the holes are not covered by seeds.

4. The seed planter according to claim 2, wherein said sensor is a fiber optic sensor having a transmitter positioned on one side of the rotating seed plate and a receiver positioned on the other side of the rotating seed plate.

5. The seed planter according to claim 1, further comprising a controller that receives a first signal from said sensor and uses said first signal to control a function of the planter.

6. The seed planter according to claim 5, further comprising a distance measuring device associated with the planter for measuring a distance traveled by the planter, and wherein said controller receives a second signal from said distance measuring device and uses said second signal to control the rotation of the rotating seed plate.

7. The seed planter according to claim 6, wherein said controller comprises a programmable means for using said first signal and said second signal to control said planter function based on the rotational position of said rotating seed plate and the location of the planter within a field.

8. The seed planter according to claim 7, wherein said programmable means comprises a means for programming a plurality of planter functions to occur in a predetermined sequence based on the position of the planter in the field, and wherein said controller ensures that the rotational position of the rotating seed plate is precisely matched to the position of the planter in the field.

9. The seed planter according to claim 6, further comprising a drive motor operatively coupled with said rotating seed plate for rotating said rotating seed plate, and a control element associated with said drive motor for controlling said drive motor responsive to a control signal from said controller.

10. The seed planter according to claim 9, wherein said drive motor is a hydraulic drive motor, and wherein said control element is an electric-operated valve for controlling a hydraulic flow to said drive motor.

11. The seed planter according to claim 9, wherein said drive motor is operatively coupled with said rotating seed plate via at least one chain and sprocket assembly that drives a driven shaft on which said rotating seed plate is mounted.

12. The seed planter according to claim 5, further comprising a GPS device and a computer algorithm for determining a location of the planter in the field, said computer algorithm having a means for generating a location signal indicative of the location of the planter in the field based on a GPS signal output from said GPS device.

13. A seed planter, comprising:
a seed chamber for receiving seeds to be planted;
a rotating seed plate that cooperates with the seed chamber to pick up and transport individual seeds from the seed chamber to a release point, where the seeds fall to the earth;
a sensor that detects the rotational position of the rotating seed plate;
a controller that receives a first signal from said sensor and uses said first signal to control a function of the planter; and
a distance measuring device associated with the planter for measuring a distance traveled by the planter, and wherein said controller receives a second signal from said distance measuring device and uses said second signal to control the rotation of the rotating seed plate;
wherein said distance measuring device comprises an encoder associated with a ground engaging wheel of the seed planter.

14. A seed planter, comprising:
a seed chamber for receiving seeds to be planted;
a rotating seed plate that cooperates with the seed chamber to pick up and transport individual seeds from the seed chamber to a release point, where the seeds fall to the earth;
a sensor that detects the rotational position of the rotating seed plate;
a controller that receives a first signal from said sensor and uses said first signal to control a function of the planter;
a GPS device and a computer algorithm for determining a location of the planter in the field, said computer algorithm having a means for generating a location signal indicative of the location of the planter in the field based on a GPS signal output from said GPS device; and
a speed sensor and a timer, wherein said computer algorithm uses the GPS signal together with an output from said speed sensor and said timer to generate and output said location signal at a pulse frequency that varies with the speed of the planter.

15. The seed planter according to claim 14, wherein said location signals are generated by said computer algorithm and pulsed to said controller at a greater frequency than said GPS signals are pulsed from the GPS device to thereby provide a more precise indication of the planter location as the planter moves through a field.

16. A seed planter, comprising:
a seed chamber for receiving seeds to be planted;
a rotating seed plate that cooperates with the seed chamber to pick up and transport individual seeds from the seed chamber to a release point, where the seeds fall to the earth;
a sensor that detects the rotational position of the rotating seed plate;
a controller that receives a first signal from said sensor and uses said first signal to control a function of the planter;
a distance measuring device associated with the planter for measuring a distance traveled by the planter, wherein said controller receives a second signal from said distance measuring device and uses said second signal to control the rotation of the rotating seed plate; and
a computer program that allows a user to input a planter setback parameter corresponding to a distance between the GPS device and a predetermined location on the planter, and an algorithm that adjusts the planter setback parameter based on the speed of the planter.

17. A seed planter, comprising:
a seed chamber for receiving seeds to be planted;
a rotating seed plate that cooperates with the seed chamber to pick up and transport individual seeds from the seed chamber to a release point, where the seeds fall to the earth;
a sensor that detects the rotational position of the rotating seed plate;
a controller that receives a first signal from said sensor and uses said first signal to control a function of the planter; and
a distance measuring device associated with the planter for measuring a distance traveled by the planter, and wherein said controller receives a second signal from said distance measuring device and uses said second signal to control the rotation of the rotating seed plate;
wherein said controller comprises a programmable means for using said first signal and said second signal to control said planter function based on the rotational position of said rotating seed plate and the location of the planter within a field;

wherein said programmable means comprises a means for programming a plurality of planter functions to occur in a predetermined sequence based on the position of the planter in the field, and wherein said controller ensures that the rotational position of the rotating seed plate is precisely matched to the position of the planter in the field; and wherein said seed planter is a seed research plot planter for planting multiple plots of seeds with each plot having a different seed type, and wherein said plurality of planter functions comprises:

a seed staging function in which seeds are placed in a staging area just above the seed chamber;

a seed loading function in which seeds are dropped from the seed staging area into the seed chamber;

a seed singulation function in which seeds in the seed chamber are picked up on the rotating seed plate and dropped off of the rotating seed plate at said release point;

an evacuation and restaging function in which a wiper element prevents additional seeds from being picked up on the rotating seed plate and excess seeds in the seed chamber are evacuated; and an alley narrowing function in which the rotating seed plate is rotated faster when the planter is in an alleyway to advance new seeds picked up on the rotating seed plate to the drop off point quicker to shorten the alleyway to a predetermined width.

18. A seed planter, comprising:

a seed chamber for receiving seeds to be planted;

a rotating seed plate that cooperates with the seed chamber to pick up and transport individual seeds from the seed chamber to a release point, where the seeds fall to the earth;

a sensor that detects the rotational position of the rotating seed plate;

a controller that receives a first signal from said sensor and uses said first signal to control a function of the planter; and an alley wiper that can be activated to wipe seeds from the rotating seed plate to create an alley with no planted seeds in the field between plots, and a means for activating said alley wiper once the last seed on the rotating seed plate needed for a plot clears the alley wiper.

19. The seed planter according to claim 18, further comprising a means for deactivating the alley wiper once a new seed variety is loaded into the seed chamber, and a means for rotating said rotating seed plate at a different speed to advance the first seed on the rotating seed plate for the next plot to a precise starting point based on inputs from said sensor that detects the rotational position of said rotating seed plate and said distance measuring device.

20. A seed planter, comprising:

a seed chamber for receiving seeds to be planted;

a rotating seed plate that cooperates with the seed chamber to pick up and transport individual seeds from the seed chamber to a release point, where the seeds fall to the earth; and a controller that controls a function of the planter to start and stop planting, said controller using a planter setback parameter corresponding to a distance between a GPS receiver and a predetermined location on the planter to determine when to start and stop planting at a predetermined location within a field, and further comprising an algorithm that adjusts the planter setback parameter based on the ground speed of the planter.

* * * * *